United States Patent
Yoshinaga et al.

(10) Patent No.: US 12,084,283 B2
(45) Date of Patent: Sep. 10, 2024

(54) ARTICLE TRANSPORT VEHICLE

(71) Applicant: Daifuku Co., Ltd., Osaka (JP)

(72) Inventors: Kazuharu Yoshinaga, Hinocho (JP); Takashi Akiyama, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 96 days.

(21) Appl. No.: 17/902,456

(22) Filed: Sep. 2, 2022

(65) Prior Publication Data
US 2023/0072839 A1    Mar. 9, 2023

(30) Foreign Application Priority Data
Sep. 3, 2021    (JP) .................. 2021-143927

(51) Int. Cl.
| | | |
|---|---|---|
| *B65G 17/12* | (2006.01) | |
| *B60P 1/28* | (2006.01) | |
| *B60Q 1/50* | (2006.01) | |
| *B62D 63/02* | (2006.01) | |

(52) U.S. Cl.
CPC ............. *B65G 17/12* (2013.01); *B60P 1/283* (2013.01); *B60Q 1/543* (2022.05); *B62D 63/02* (2013.01)

(58) Field of Classification Search
CPC ...... B60Q 1/543; B62D 63/02; B65G 1/0492; B65G 1/065; B65G 1/1378; B65G 47/962; B65G 47/38; B65G 47/94; B65G 47/945; B65G 47/96; B65G 17/32; B65G 17/345; B65G 2207/18; B60P 1/283
USPC .............................................. 198/469.1, 579
See application file for complete search history.

(56) References Cited

U.S. PATENT DOCUMENTS

| | | | | |
|---|---|---|---|---|
| 4,787,498 | A * | 11/1988 | Males ................... | B65G 47/962 |
| | | | | 198/802 |
| 10,974,913 | B1 * | 4/2021 | Nussbaum ........... | B65G 47/962 |
| 11,001,443 | B1 * | 5/2021 | Skaloud ................ | B62D 63/04 |
| 11,084,666 | B1 * | 8/2021 | Eddy ..................... | B65G 1/1378 |
| 11,124,233 | B1 * | 9/2021 | Kurczewski ............ | B60G 9/02 |
| 2004/0079618 | A1 * | 4/2004 | Abildgaard .......... | B65G 47/962 |
| | | | | 198/370.04 |
| 2006/0260908 | A1 * | 11/2006 | Affaticati ............. | B65G 47/962 |
| | | | | 198/370.04 |

(Continued)

FOREIGN PATENT DOCUMENTS

| | | | | | |
|---|---|---|---|---|---|
| CN | 109794418 | A * | 5/2019 | ............... | B07C 3/08 |
| CN | 112591365 | A * | 4/2021 | ............... | B60K 1/00 |

(Continued)

*Primary Examiner* — Gene O Crawford
*Assistant Examiner* — Muhammad Awais
(74) *Attorney, Agent, or Firm* — The Webb Law Firm

(57) ABSTRACT

A placement body on which an article is placed is driven by a transfer drive mechanism to transfer the article. The transfer drive mechanism includes a transfer drive source and a transmission mechanism. The transmission mechanism includes an output member coupled to an output shaft of the transfer drive source and a driven member that is not coupled to the output member and operates by being pressed by the output member. A wheel drive source, the transfer drive source, and the output member are supported by a vehicle body frame, and the placement body and the driven member are supported by a vehicle body cover. The vehicle body cover covers the wheel drive source and the transfer drive source and is detachably attached to the vehicle body frame.

8 Claims, 14 Drawing Sheets

(56) References Cited

U.S. PATENT DOCUMENTS

| | | | | |
|---|---|---|---|---|
| 2013/0126304 A1* | 5/2013 | Stikkelorum | ........ | B65G 47/962 |
| | | | | 198/477.1 |
| 2013/0248323 A1* | 9/2013 | Sotelo | ................. | B65G 47/967 |
| | | | | 198/370.04 |
| 2013/0341157 A1* | 12/2013 | Fortenbery | .......... | B65G 47/962 |
| | | | | 198/370.04 |
| 2015/0073589 A1* | 3/2015 | Khodl | .................. | B65G 1/1378 |
| | | | | 700/218 |
| 2016/0046453 A1* | 2/2016 | Fujio | ..................... | B65G 21/22 |
| | | | | 198/469.1 |
| 2020/0049244 A1* | 2/2020 | Porat | ....................... | F16H 25/18 |
| 2020/0401133 A1* | 12/2020 | Armbrust | .............. | G05D 1/0214 |
| 2021/0253370 A1* | 8/2021 | Futch | ..................... | B65G 1/0492 |
| 2022/0009396 A1 | 1/2022 | Yoshinaga | | |
| 2022/0219601 A1* | 7/2022 | Eggensperger | ........ | B60Q 1/543 |

FOREIGN PATENT DOCUMENTS

| | | | | | |
|---|---|---|---|---|---|
| CN | 114435892 | A | * | 5/2022 | |
| EP | 3670390 | A1 | * | 6/2020 | ........... B65G 1/0492 |
| JP | 5221516 | A | | 8/1993 | |
| KR | 102232446 | B1 | * | 3/2021 | |
| WO | WO-2020129322 | A1 | * | 6/2020 | ................ B60P 1/04 |
| WO | WO-2020247986 | A1 | * | 12/2020 | ........... B65G 1/0492 |
| WO | WO-2021059006 | A1 | * | 4/2021 | ........... B65G 1/0492 |
| WO | WO-2021165949 | A1 | * | 8/2021 | ............. B65G 35/06 |
| WO | WO-2022112166 | A1 | * | 6/2022 | ........... B65G 1/0464 |

\* cited by examiner

ARTICLE TRANSPORT VEHICLE

CROSS REFERENCE TO RELATED APPLICATION

The application claims priority to Japanese Patent Application No. 2021-143927, filed Sep. 3, 2021, the disclosure of which is hereby incorporated by reference in its entirety.

BACKGROUND OF THE INVENTION

1. Field of the Invention

The present invention relates to an article transport vehicle that transports an article and includes a vehicle body frame, a vehicle body cover, a wheel supported by the vehicle body frame, a wheel drive source, a placement body on which an article is placed, and a transfer drive mechanism that drives the placement body to transfer the article.

2. Description of the Related Art

JP H5-221516A discloses an article transport vehicle (1) that includes transfer devices (15, 16, 17) that serve as placement bodies on which articles are placed, a base (3) that serves as a vehicle body frame on which the transfer devices are placed, and a lift motor (4) that serves as a transfer drive mechanism for transferring articles and moves the base up and down together with the transfer devices. It is possible to engage the transfer devices (15, 16, 17), which are attachments of different types, and the base (3) without using a bolt or the like, and thus the transfer devices (15, 16, 17) can be attached to and detached from the base (3). That is, it is possible to easily replace the transfer devices (15, 16, 17) according to an article to be transported or a transport work.

In the article transport vehicle (1) disclosed in the document described above, the transfer devices (15, 16, 17) are configured to be easily replaceable, but the lift motor (4) is housed in the base (3). The lift motor (4) is not configured to be easily replaceable when the lift motor has broken down or deteriorated over time, for example. In addition to the above, it is thought that a drive source for driving wheels, a power supply for supplying driving power to the drive source and the lift motor (4), and a transfer drive mechanism for moving the transfer devices (15, 16, 17) up and down are also housed in the base (3), and it cannot be said that maintenance of these is not easy as well.

SUMMARY OF THE INVENTION

In view of the foregoing, there is demand for an article transport vehicle that makes it possible to easily perform maintenance of drive sources of wheels and a placement body, a transfer drive mechanism, and the like.

In view of the foregoing, an article transport vehicle is configured to transport an article and includes: a vehicle body frame; a vehicle body cover; a wheel supported in such a manner as to be rotatable relative to the vehicle body frame; a wheel drive source configured to drive the wheel; a placement body including a placement surface on which the article is placeable; and a transfer drive mechanism configured to drive the placement body to transfer the article, wherein the transfer drive mechanism includes: a transfer drive source; and a transmission mechanism configured to transmit driving force from the transfer drive source to the placement body, the transmission mechanism includes: an output member coupled to an output shaft of the transfer drive source; and a driven member configured to be driven by the output member, the placement body moves in conjunction with the driven member, the driven member is not coupled to the output member and is configured to operate by being pressed by the output member, the wheel drive source, the transfer drive source, and the output member are supported by the vehicle body frame, the placement body and the driven member are supported by the vehicle body cover, and the vehicle body cover covers the wheel drive source and the transfer drive source and is detachably attached to the vehicle body frame.

According to this configuration, the placement body and the driven member are supported by the vehicle body cover, and the wheel drive source, the transfer drive source, and the output member are supported by the vehicle body frame. Also, the driven member that operates by being pressed by the output member is not coupled to the output member. That is, the vehicle body cover is attached to the vehicle body frame in such a manner as to be attachable to and detachable from the vehicle body frame while supporting the placement body and the driven member. The vehicle body cover covers the wheel drive source and the transfer drive source, and accordingly, when the vehicle body cover is removed from the vehicle body frame, maintenance of the wheel drive source and the transfer drive source can be easily performed. Also, the output member is coupled to the output shaft of the transfer drive source, and accordingly, maintenance of the output member can be easily performed as well. As described above, according to this configuration, it is possible to provide an article transport vehicle that makes it possible to easily perform maintenance of the drive sources of the wheel and the placement body, the transfer drive mechanism, and the like.

Further features and advantages of the article transport vehicle will be more apparent from the following description of exemplary and non-limiting embodiments given with reference to the drawings.

DESCRIPTION OF THE INVENTION

Figure 1:
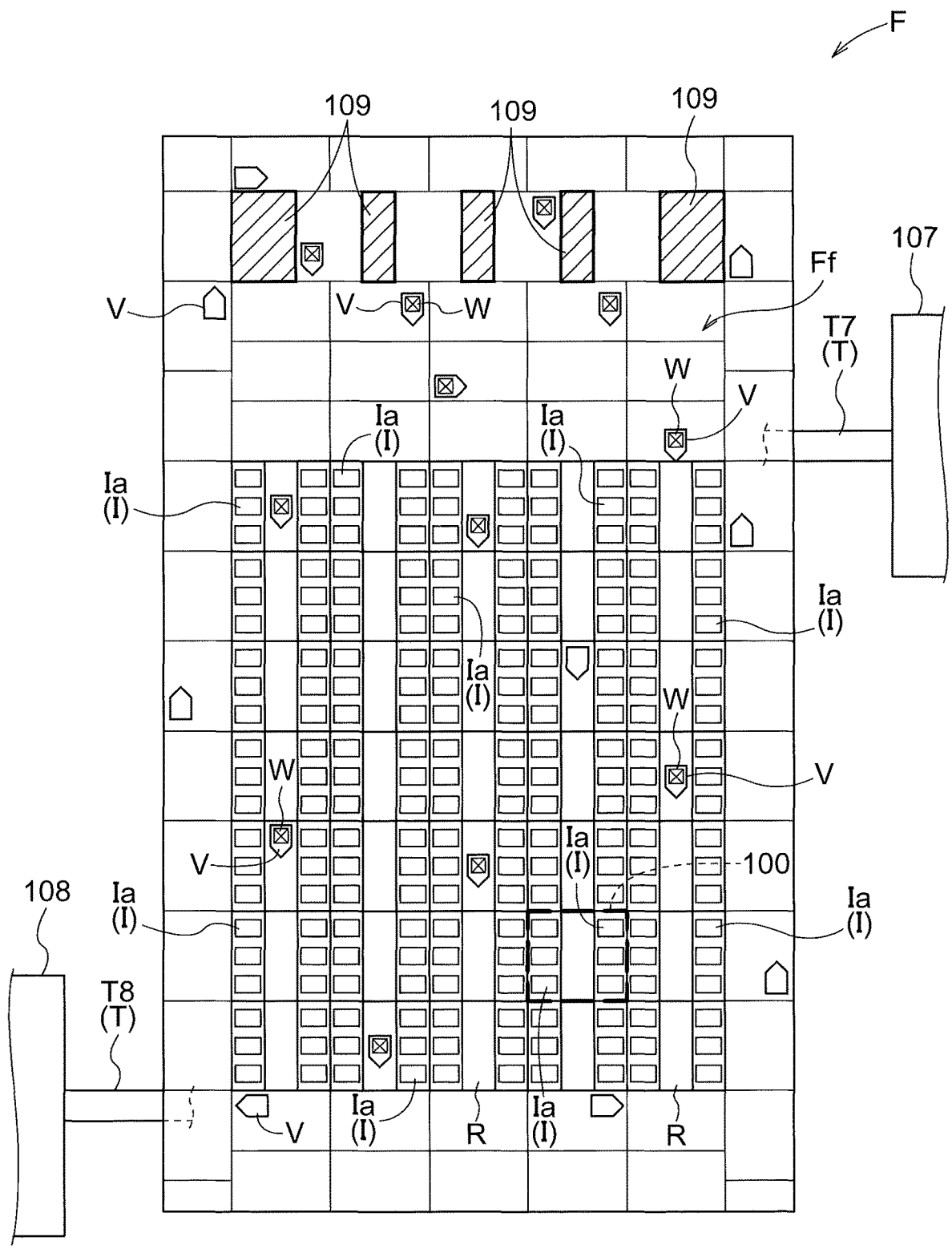
FIG. 1 is a plan view of an article transport facility including article transport vehicles.

The following describes an embodiment of an article transport vehicle in a case where the article transport vehicle is provided in an article transport facility for sorting and transporting articles. First, the following describes an overview of an article transport facility F with reference to FIGS. 1 to 5. As shown in FIG. 1, the article transport facility F includes a traveling surface Ff on which article transport vehicles V travel, article supply sections 109 for supplying transport target articles W to the article transport vehicles V, and receiving sections I for receiving articles W transported by the article transport vehicles V. The traveling surface Ff is formed as a spreading flat surface, and passages R along which the article transport vehicles V travel are set on the traveling surface Ff. The receiving sections I are provided at a plurality of positions on the traveling surface Ff. In the present embodiment, each of the receiving sections I provided at the plurality of positions includes a receiving opening Ia through which an article W is guided to a position below the traveling surface Ff.

Figure 2:
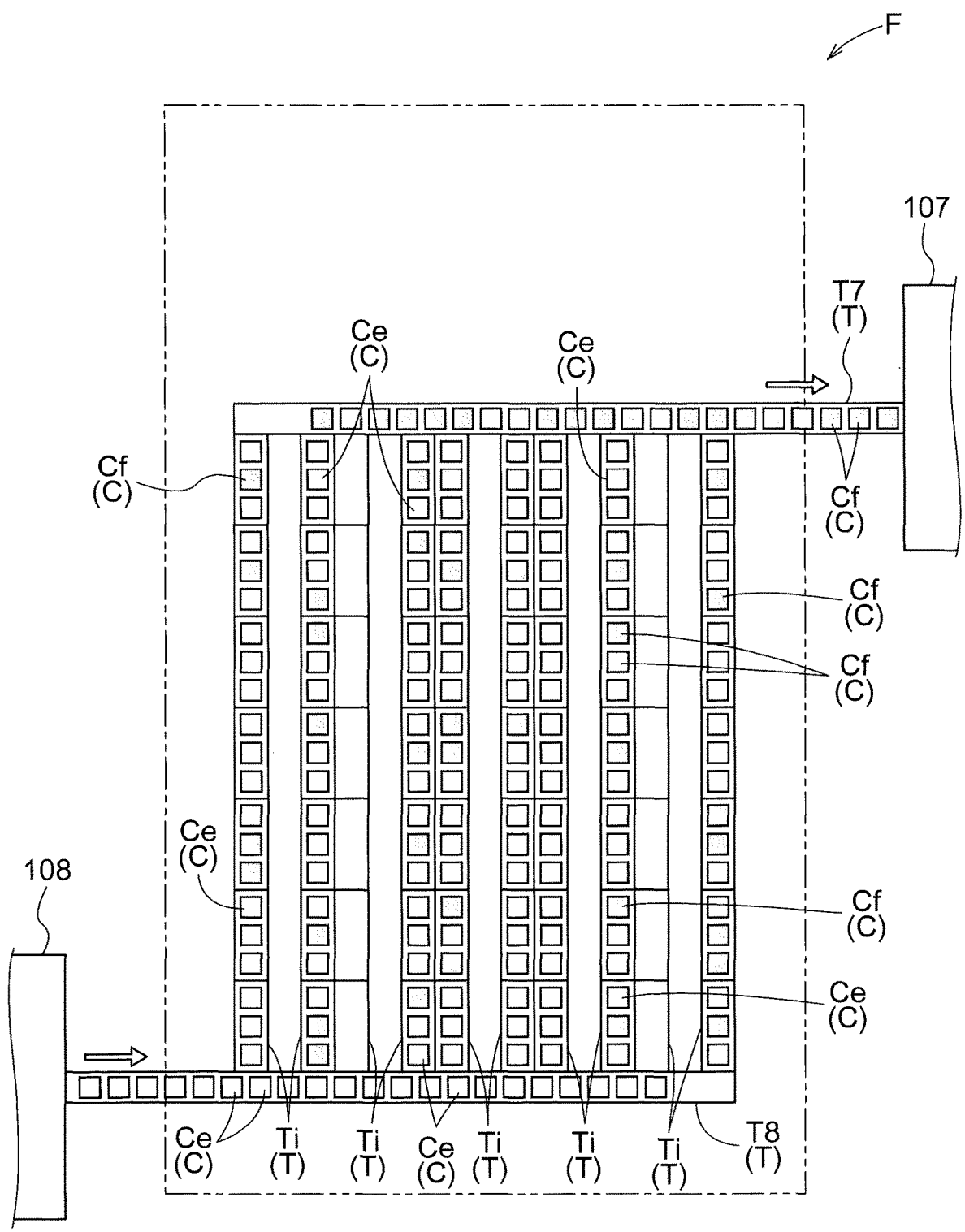
FIG. 2 is an illustrative diagram showing container transport routes.
Figure 3:
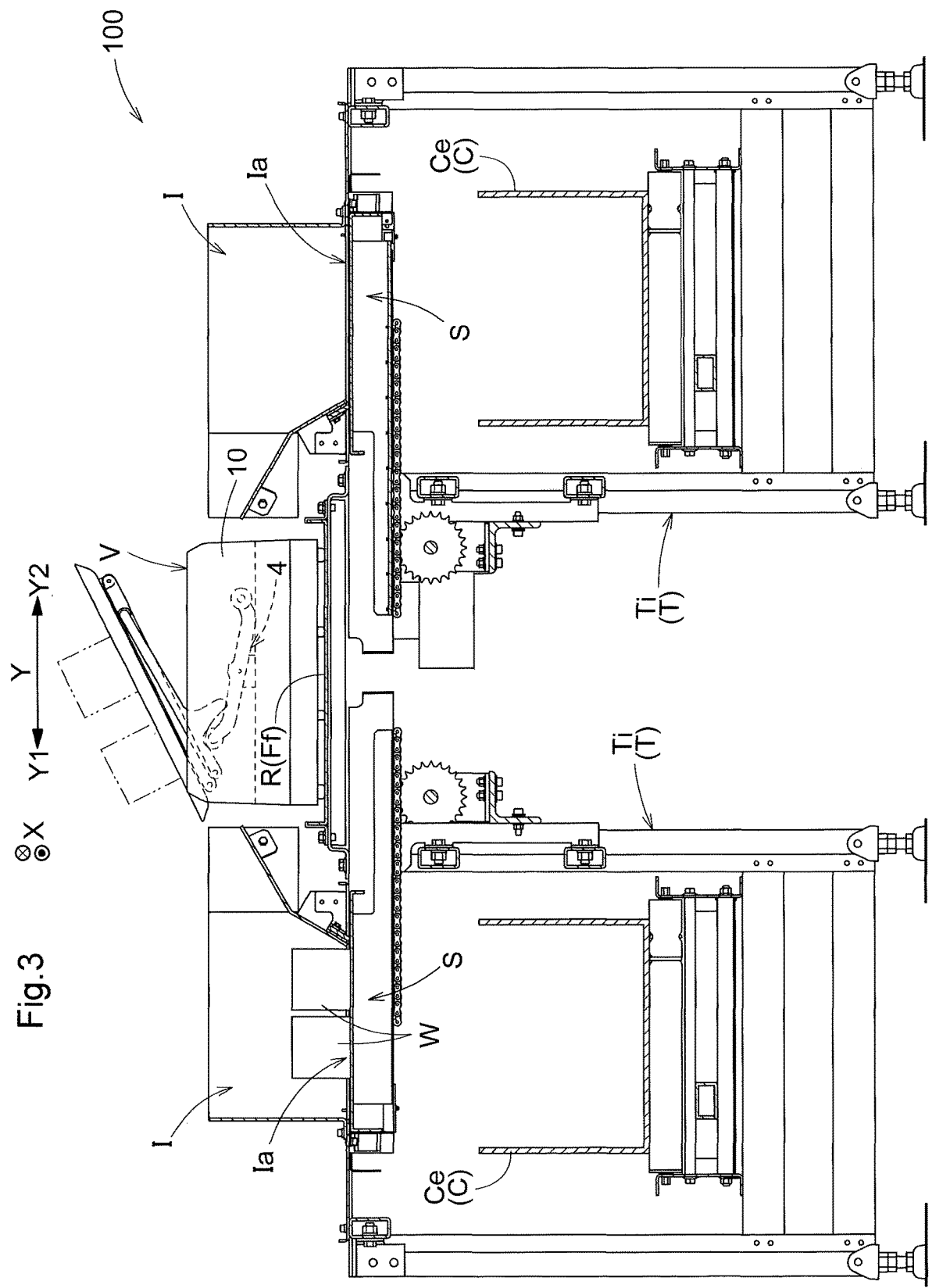
FIG. 3 is a traveling direction view showing how articles are transferred by an article transport vehicle.
Figure 4:
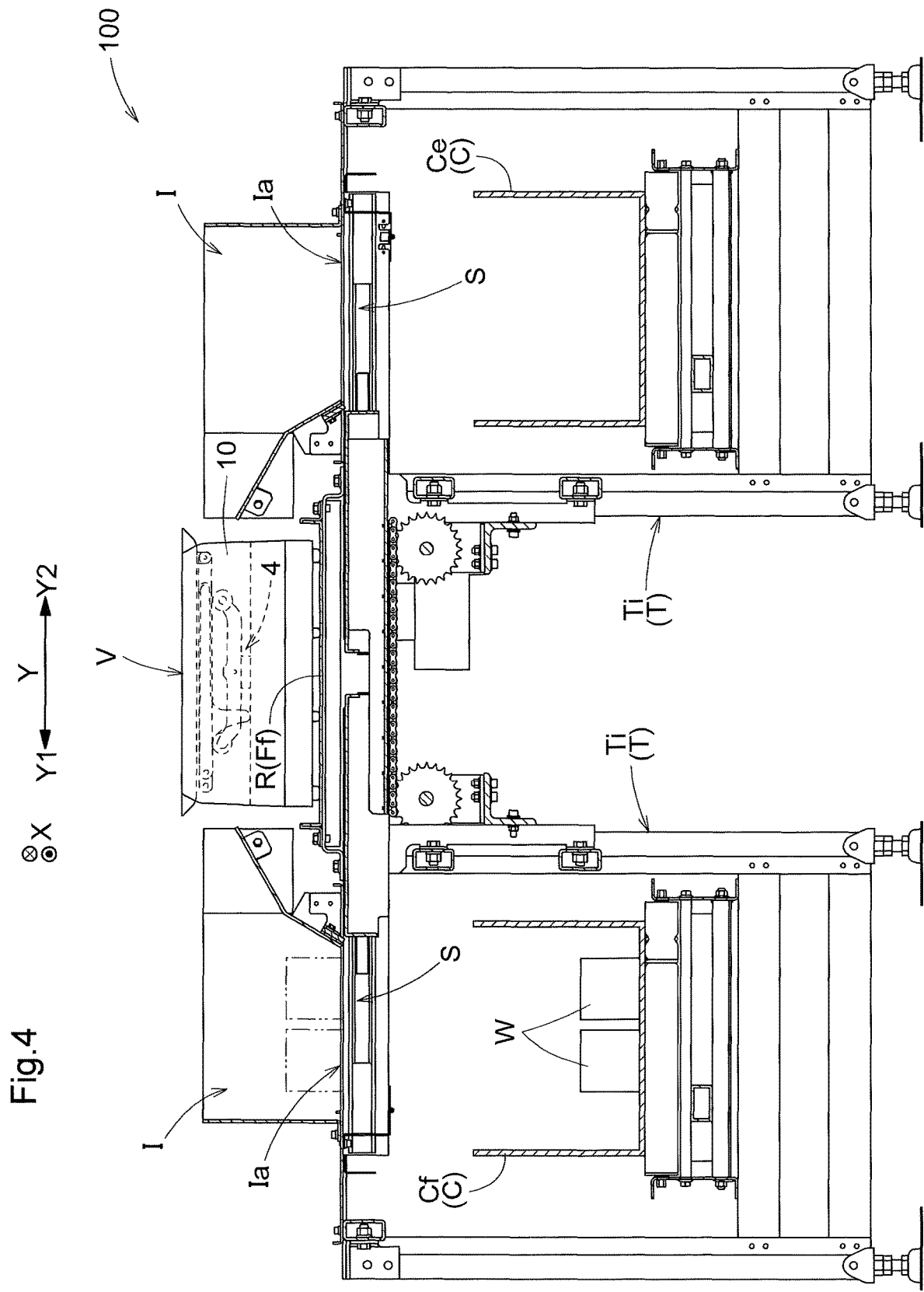
FIG. 4 is a traveling direction view showing how articles are dropped onto a conveyor unit.
Figure 5:
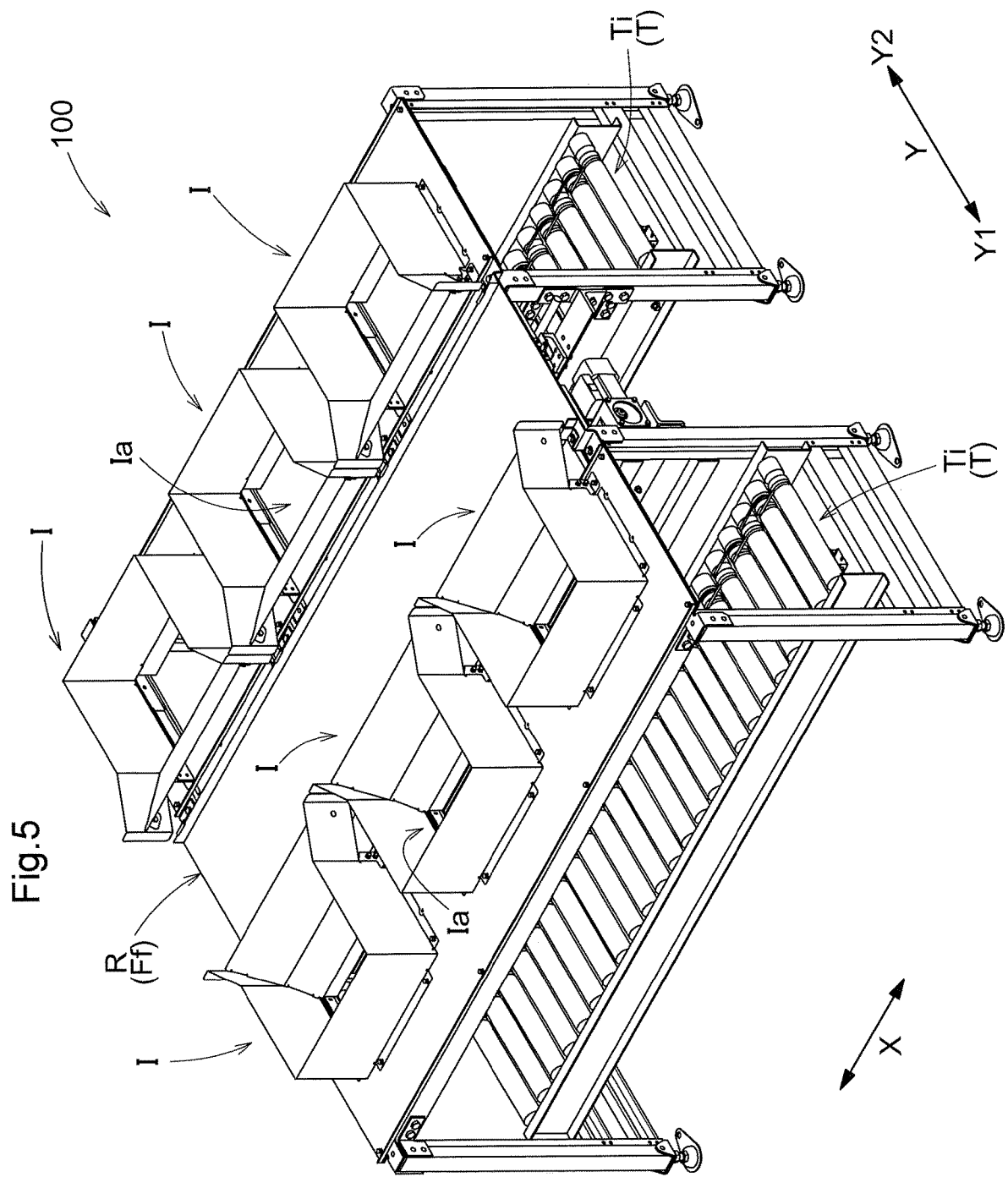
FIG. 5 is a perspective view of a frame unit.

As shown in FIG. 2, the article transport facility F includes a transport section T for transporting containers C for storing articles W, an empty container supply section 108 for supplying containers C (empty containers Ce) not storing any article W, and a shipping section 107 for shipping containers C (filled containers Cf) storing at least one article W received from the article transport vehicles V via the receiving sections I (receiving openings Ia). As shown in FIGS. 3 to 5, for example, the transport section T is arranged below the traveling surface Ff described above. In the present embodiment, the transport section T includes an empty container loading section T8 for receiving empty containers Ce supplied from the empty container supply section 108, a filled container unloading section T7 for discharging filled containers Cf storing articles W received in the receiving sections I, and receiving/transporting sections Ti provided so as to connect the empty container loading section T8 and the filled container unloading section T7. In the present embodiment, the transport section T includes a plurality of receiving/transporting sections Ti, and each of the receiving/transporting sections Ti is provided so as to connect the empty container loading section T8 and the filled container unloading section T7. In this example, the plurality of receiving/transporting sections Ti are arranged side by side in parallel in a plan view. As shown in FIG. 5, in the present embodiment, the empty container loading section T8, the filled container unloading section T7, and the receiving/transporting sections Ti are each constituted by a conveyor.

As shown in FIGS. 3 to 5, for example, the receiving sections I are arranged in such a manner as to be overlapped with the receiving/transporting sections Ti when viewed in the up-down direction. Containers C are arranged at positions corresponding to the receiving sections I in the receiving/transporting sections Ti. Accordingly, articles W received from the article transport vehicles V in the receiving sections I are guided through the receiving openings Ia to positions below the traveling surface Ff, and are then stored in containers C arranged in the receiving/transporting sections Ti (see FIGS. 3 and 4, for example). In the present embodiment, a plurality of receiving sections I are arranged side by side with each other for each of the receiving/transporting sections Ti. Also, a container C is arranged at a position corresponding to each of the receiving sections I, or more specifically at a position directly under each of the receiving sections I.

Also, in the present embodiment, the article transport facility F includes shutters S (see FIGS. 3 and 4) for opening and closing the receiving openings Ia. Each shutter S keeps the corresponding receiving opening Ia closed until the receiving section I has received at least one article W that is to be sorted based on sorting information (see FIG. 3). The shutter S then opens the receiving opening Ia after the receiving section I has received at least one article W that is to be sorted based on the sorting information (see FIG. 4). Accordingly, the articles W sorted to the receiving sections I by the article transport vehicles V pass through the receiving openings Ia and are guided to positions below the traveling surface Ff, and are stored in containers C arranged in the receiving/transporting sections Ti.

In each of the article supply sections 109, an article W for which a specified receiving section I has been designated as a transport destination based on the sorting information is supplied to an article transport vehicle V by a supply entity such as a worker or a robot, for example. The article transport vehicle V that received the article W in the article supply section 109 then travels along a passage R defined on the traveling surface Ff, and transports the article W to the receiving section I that was designated based on the sorting information.

Each of the receiving sections I is provided with a position information holder (not shown) that holds position information indicating a position corresponding to the receiving section I. An article transport vehicle V travels toward a specified receiving section I that was designated as a transport destination, and when a position information detector (not shown) detects the position information held by the position information holder that corresponds to the specified receiving section I, the article transport vehicle V stops at that position (or transitions to a low-speed traveling state) and transfers an article W to that receiving section I. The position information holder is constituted by, for example, an indicator such as a barcode (e.g., a two-dimensional barcode) that indicates position information, a storage element such as an RFID tag (radio frequency identifier tag) that stores position information, or a signal transmitter such as a beacon that emits a signal indicating position information. For example, if the position information holder is a barcode, the position information detector is configured as a barcode reader, if the position information holder is an RFID tag, the position information detector is configured as an RFID reader, and if the position information holder is a beacon, the position information detector is configured as a signal receiver.

In the present embodiment, the article transport facility F is configured by arranging a plurality of frame units 100 (see FIG. 5) side by side in a grid pattern in a plan view as shown in FIGS. 1 and 2. Each frame unit 100 includes the traveling surface Ff in which three receiving openings Ia are arranged on each of two sides of a passage R, and receiving/transporting sections Ti arranged in two rows in such a manner as to be overlapped with the traveling surface Ff (the receiving openings Ia) when viewed in the up-down direction. In FIG. 1, one of the plurality of frame units 100 is denoted by the reference sign.

In the present embodiment, as shown in FIGS. 1 and 2, 21 receiving sections I are provided for each receiving/transporting section Ti, and the empty container loading section T8 and the filled container unloading section T7 each transport 21 containers C synchronously as a container group. In this case, the receiving/transporting sections Ti each transport a group of 21 containers C after articles W have been stored in all of the 21 containers C included in that container group.

The following describes details of the article transport vehicles V with reference to FIGS. 6 to 15 as well. As shown in FIGS. 3 and 4, each article transport vehicle V travels along a passage R defined on the traveling surface Ff (see FIG. 1) with an article W placed on a placement body 3 and transports the article W from an article supply section 109 to a receiving section I. Although described in detail later, the article transport vehicle V transfers the article W from the placement body 3 to a receiving opening Ia by tilting the placement body 3 beside the receiving opening Ia.

When directions are described with reference to the article transport vehicle V, a direction extending along a first axis A1, which is a swing axis about which the placement body 3 is caused to swing to be tilted as described later, will be referred to as an axial direction L of the article transport vehicle V extending along a horizontal plane. When the article transport vehicle V travels along a traveling direction X, the axial direction L extends along the traveling direction X, and when the article transport vehicle V travels straight, the axial direction L matches the traveling direction X. Also, a direction orthogonal to the axial direction L in a plan view will be referred to as a vehicle body width direction H. In the state where the axial direction L matches the traveling direction X, the vehicle body width direction H matches a width direction Y. One side in the vehicle body width direction H will be referred to as a first side H1 in the vehicle body width direction, and the other side will be referred to as a second side H2 in the vehicle body width direction.

Figure 6:
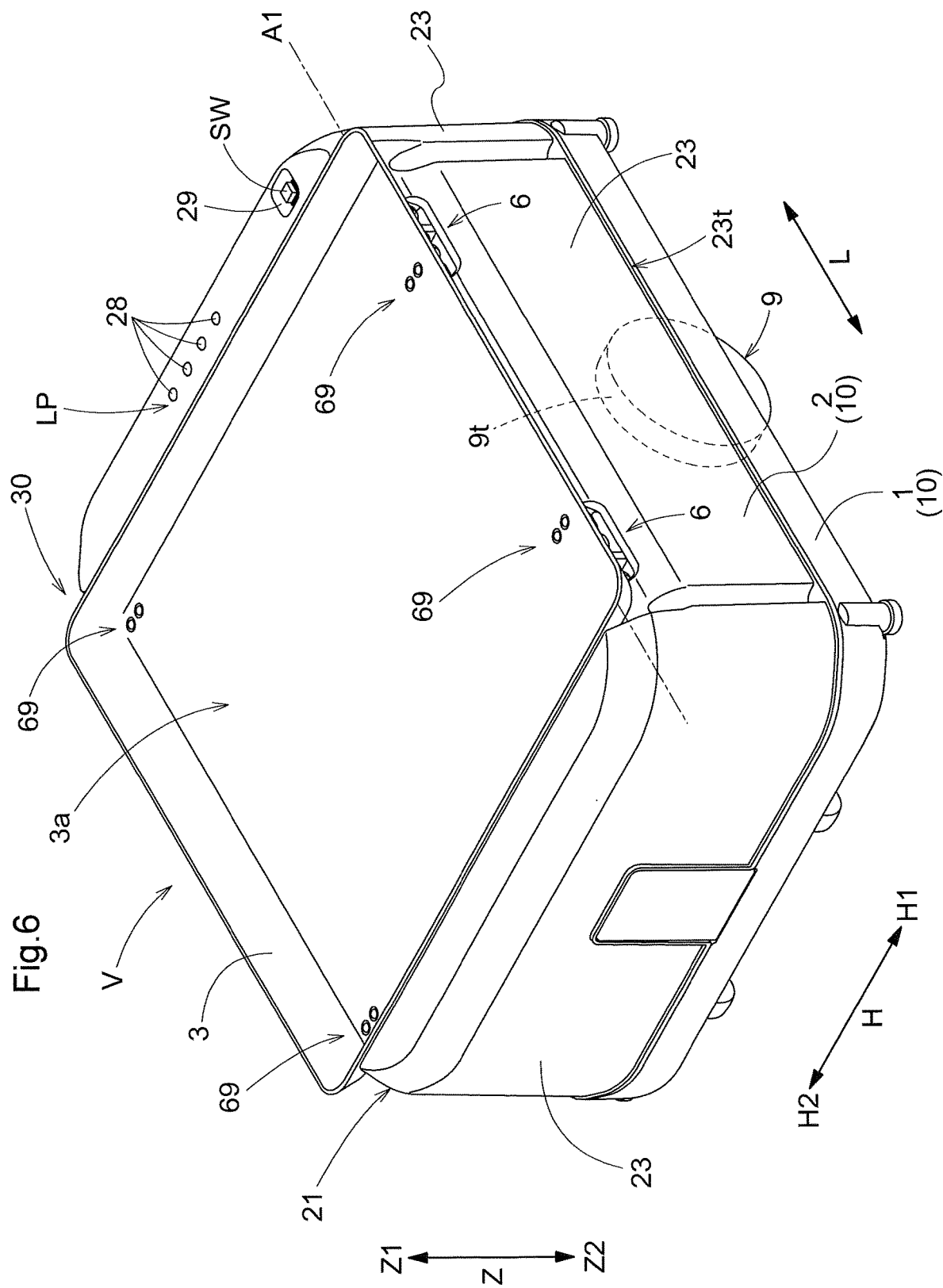
FIG. 6 is a perspective view of an article transport vehicle.
Figure 11:
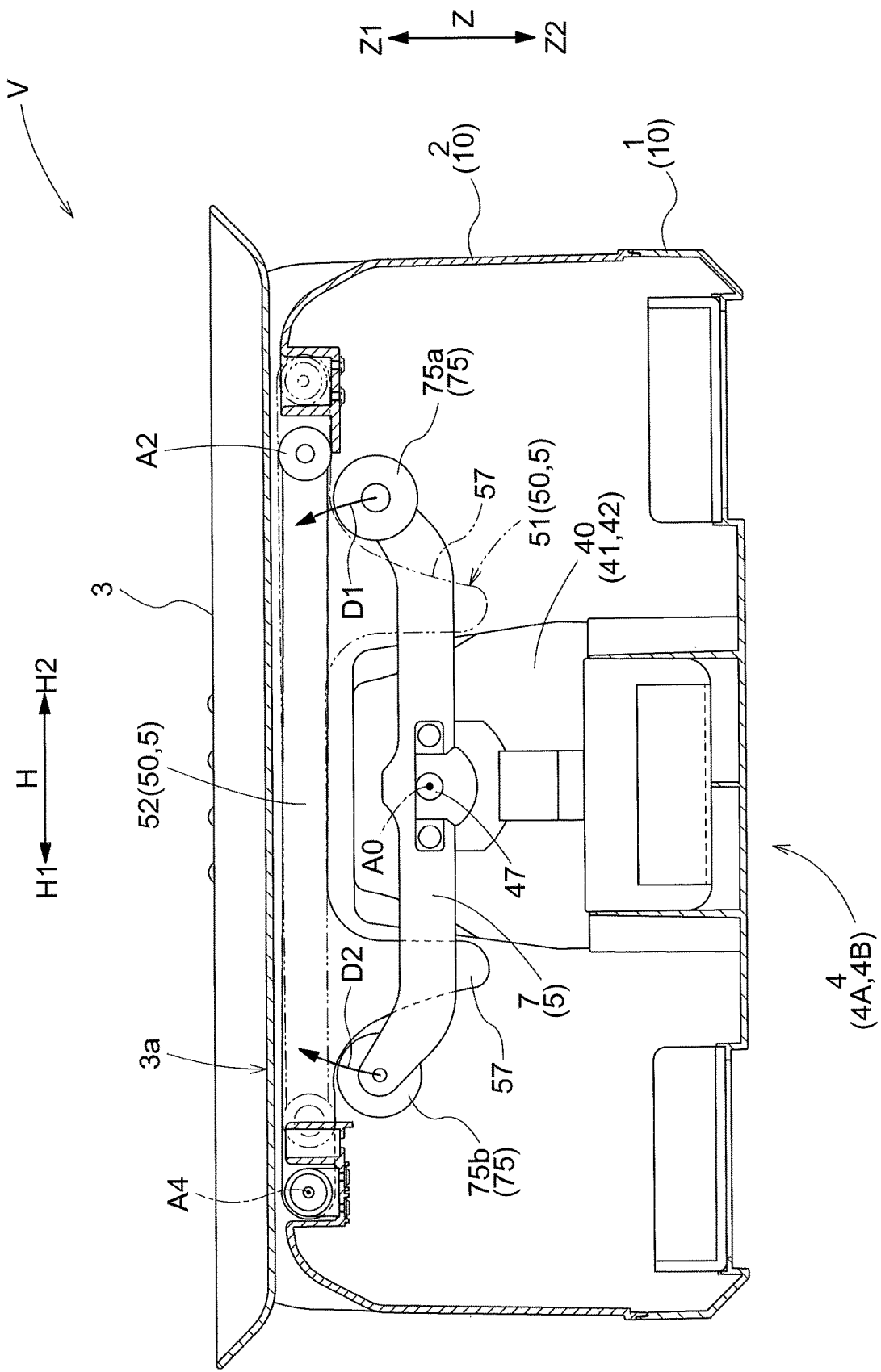
FIG. 11 is a cross-sectional view of the article transport vehicle taken along a plane orthogonal to an axis.

As shown in FIG. 6, for example, the article transport vehicle V includes a carriage body 10 that includes a vehicle body frame 1 and a vehicle body cover 2 and a transfer device 30 that is mounted on the carriage body 10, and the article transport vehicle V transports an article W. The article transport vehicle V also includes a wheel 9 (see FIGS. 6 and 7) that is supported in such a manner as to be rotatable relative to the vehicle body frame 1 and a wheel drive source 90 (see FIG. 7) that drives the wheel 9. The wheel drive source 90 is an electric motor, for example, and operates by being supplied with power from a power storage body B (see FIG. 16), such as a storage battery or a capacitor, mounted on the article transport vehicle V. As shown in FIGS. 6 and 11, for example, the transfer device 30 includes the placement body 3 that includes a placement surface 3a on which an article W is placeable, a coupling mechanism 6 that couples the placement body 3 and the carriage body 10, and a transfer drive mechanism 4 that drives the placement body 3 to transfer the article W.

In the present embodiment, the placement body 3 is shaped as a tray with an edge portion of the plate-shaped placement surface 3a protruding upward, and an article W is placed on the upper side of the placement surface 3a. The carriage body 10 includes an opposing surface 2a that faces a lower surface 3b of the placement body 3. Although described in detail later, the placement body 3 provided above the carriage body 10 is configured to swing relative to the carriage body 10 about an axis extending along the axial direction L. That is, the placement body 3 is configured to swing between a reference position at which the placement body 3 extends along the opposing surface 2a of the carriage body 10 and a standing position at which the placement body 3 is tilted relative to the opposing surface 2a. The transfer drive mechanism 4 is a mechanism for changing an angle of the placement surface 3a.

As shown in FIG. 11, the transfer device 30 includes a transfer drive source 40 that is constituted by a motor or the like. In the present embodiment, the transfer device 30 is configured to cause the placement body 3 to swing relative to the carriage body 10 about an axis (the first axis A1 or a third axis A3) extending along the axial direction L (the traveling direction X). As shown in FIG. 3, the transfer device 30 tilts the placement body 3 in the vehicle body width direction H (the width direction Y) to cause the article W to slide in the width direction Y on the placement body 3, and thus transfer the article W to a transfer location outward of the article transport vehicle V in the vehicle body width direction H (the width direction Y).

Figure 13:
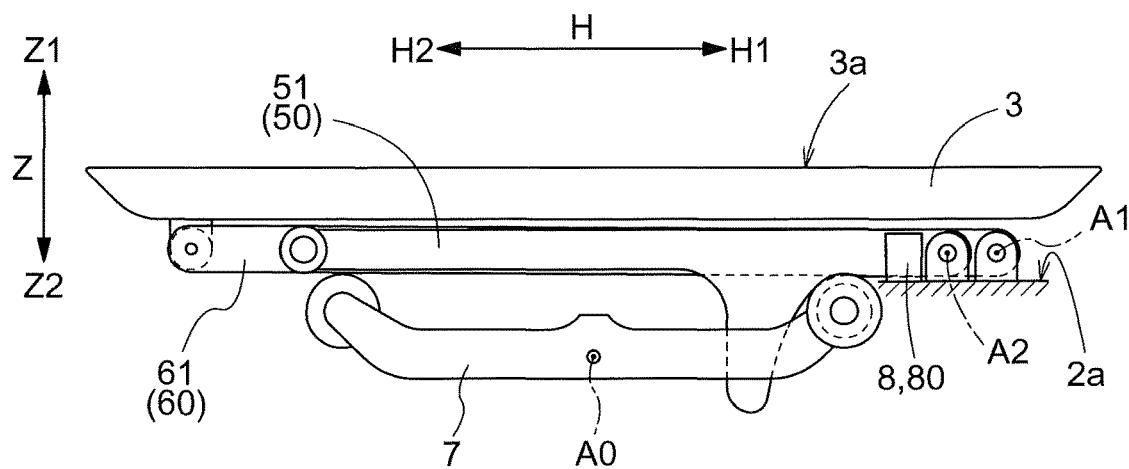
FIG. 13 is a diagram showing a relationship between the placement body in a non-tilted state and the swing arm and the support arm.
Figure 14:
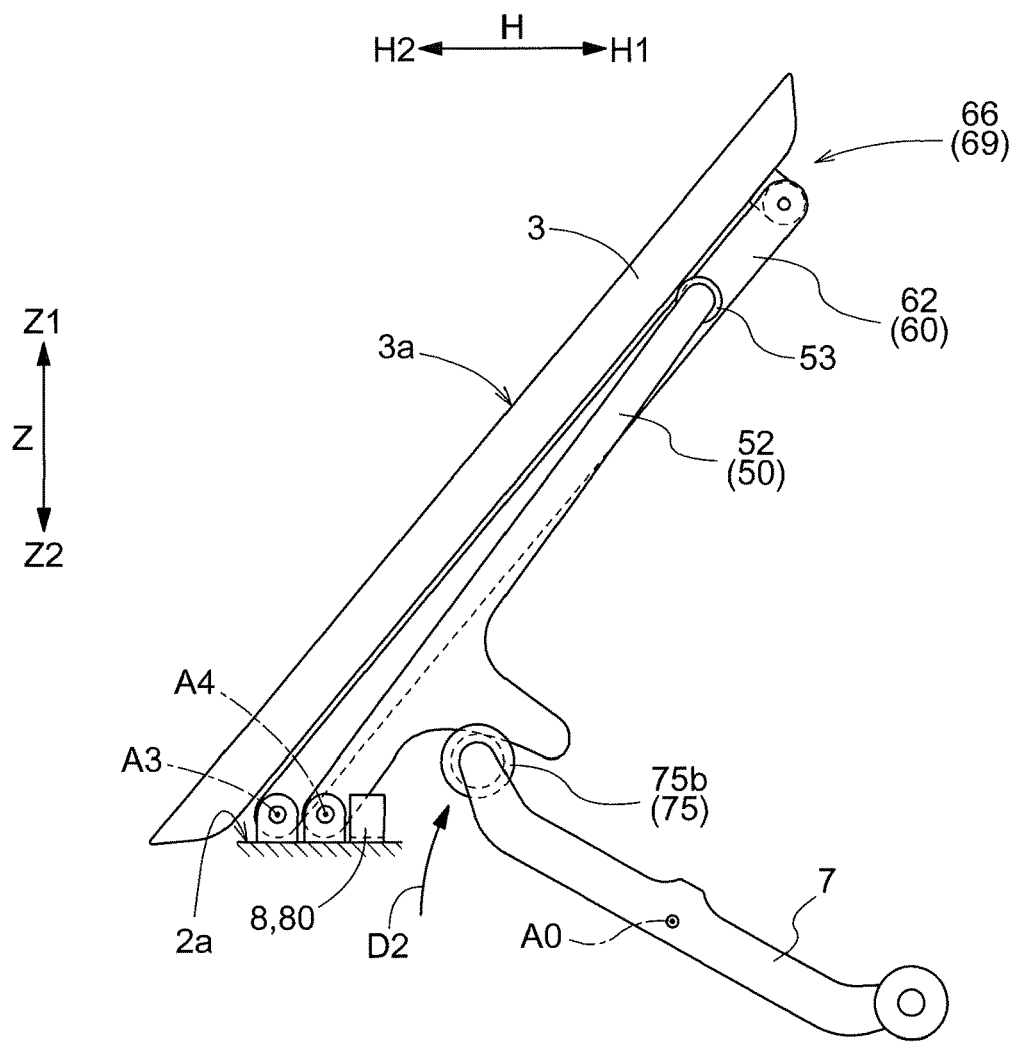
FIG. 14 is a diagram showing a relationship between the placement body in a second tilted state and a swing arm and a support arm.
Figure 15:
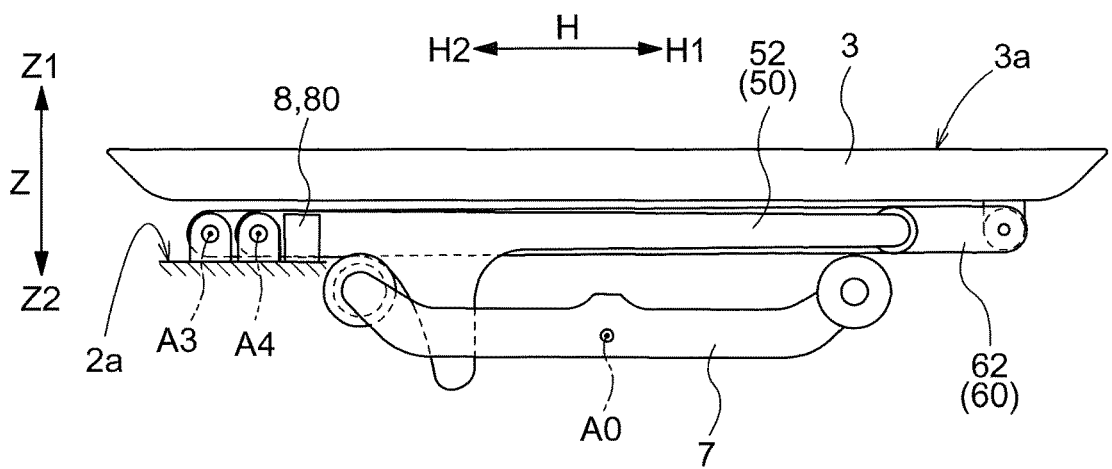
FIG. 15 is a diagram showing a relationship between the placement body in the non-tilted state and the swing arm and the support arm.

In the present embodiment, the transfer device 30 is configured to cause the placement body 3 to swing relative to the carriage body 10 about the first axis A1 (see FIGS. 12 and 13), as well as about the third axis A3 (see FIGS. 14 and 15). That is, the article transport vehicle V is capable of transferring an article W to each of receiving sections I (transfer locations) respectively arranged on the first side H1 and the second side H2 in the vehicle body width direction (a first side Y1 and a second side Y2 in the width direction) relative to the article transport vehicle V by causing the placement body 3 to swing. Note that FIG. 3 shows a state in which articles W are transferred to a receiving section I that is on the first side Y1 in the width direction (the first side H1 in the vehicle body width direction) when viewed from the article transport vehicle V.

Figure 7:
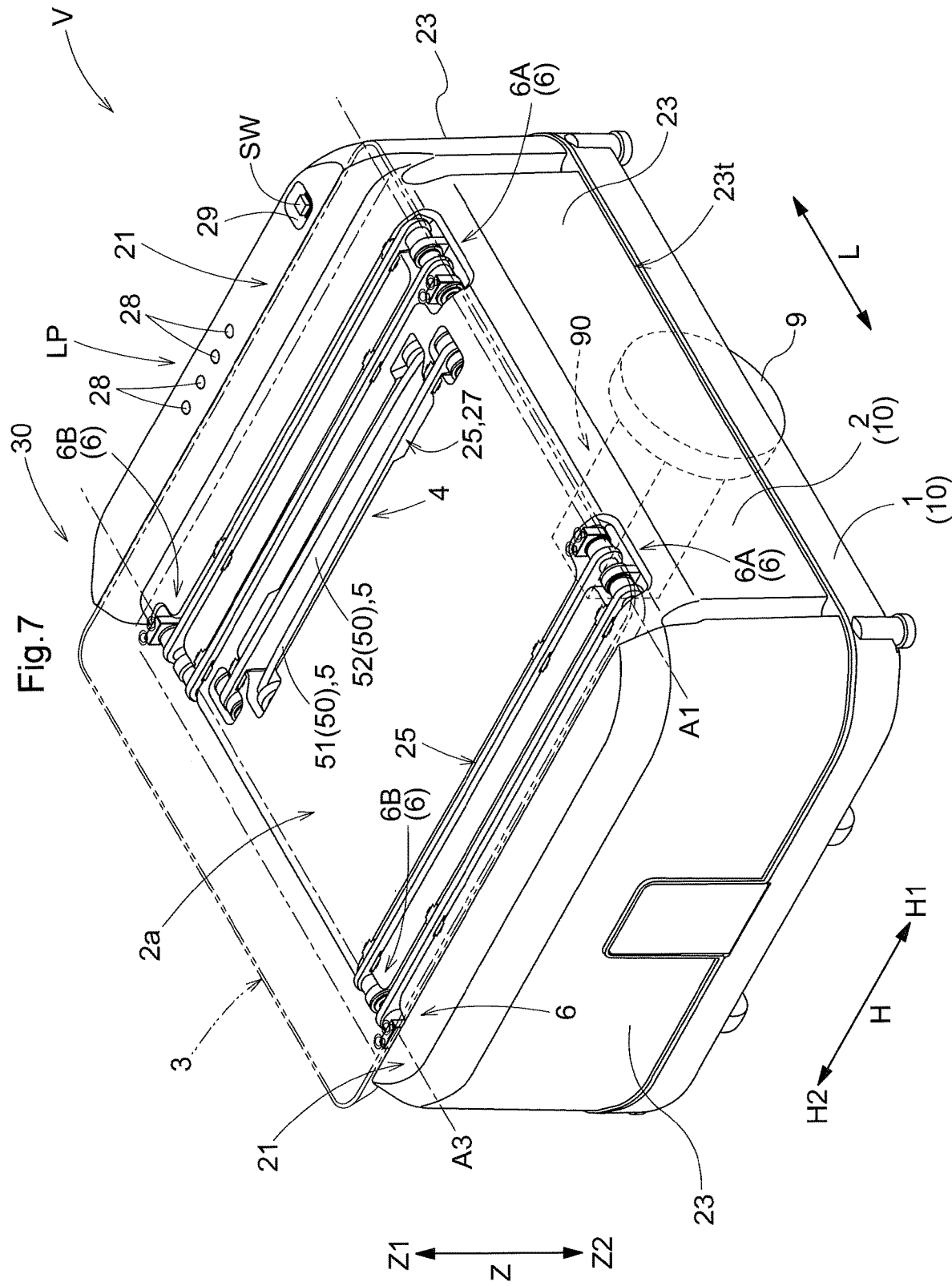
FIG. 7 is a transparent perspective view of the article transport vehicle.
Figure 8:
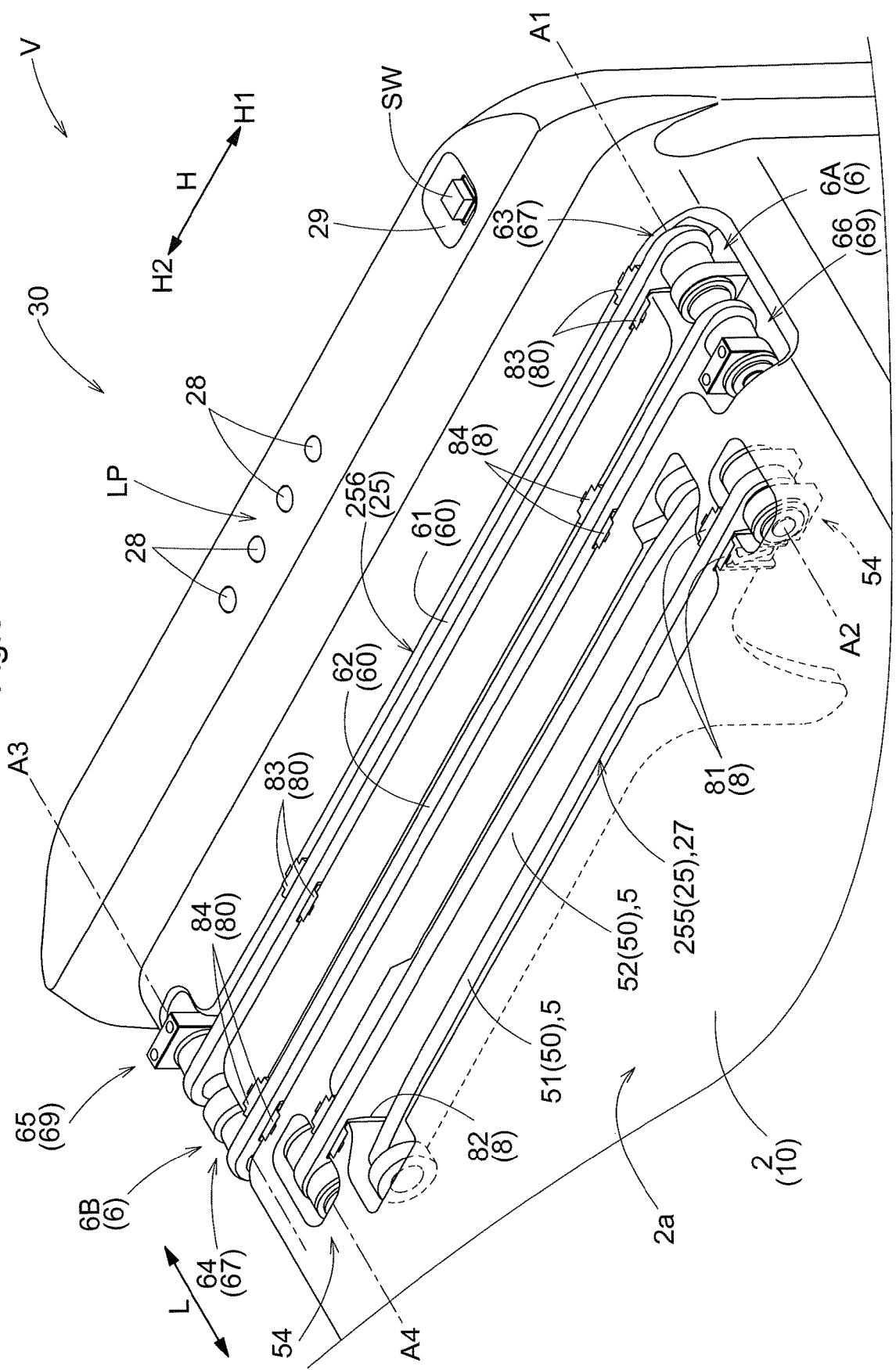
FIG. 8 is an enlarged perspective view of swing arms and support arms that are housed.

Also, in the present embodiment, a first coupling mechanism 6A and a second coupling mechanism 6B are provided as the coupling mechanism 6, and a first transfer drive mechanism 4A and a second transfer drive mechanism 4B are provided as the transfer drive mechanism 4. As shown in FIGS. 7 and 8, for example, the first coupling mechanism 6A couples the placement body 3 and the carriage body 10 in such a manner that the placement body 3 is swingable relative to the carriage body 10 about the first axis A1 extending along the horizontal plane. The first transfer drive mechanism 4A includes a first swing arm 51 (a swing arm 50) that swings about a second axis A2 parallel to the first axis A1 and a first transfer drive source 41 that causes the first swing arm 51 to swing. The second coupling mechanism 6B couples the placement body 3 and the carriage body 10 in such a manner that the placement body 3 is swingable relative to the carriage body 10 about the third axis A3 extending along the horizontal plane. The second transfer drive mechanism 4B includes a second swing arm 52 (a swing arm 50) that swings about a fourth axis A4 parallel to the third axis A3 and a second transfer drive source 42 that causes the second swing arm 52 to swing. Note that the third axis A3 is parallel to the first axis A1, and the first axis A1, the second axis A2, the third axis A3, and the fourth axis A4 are parallel to each other.

In the present embodiment, a configuration is described as an example in which the first axis A1 and the second axis A2 are separate axes, but the first axis A1 and the second axis A2 may be the same axis. Likewise, a configuration is described as an example in which the third axis A3 and the fourth axis A4 are separate axes, but the third axis A3 and the fourth axis A4 may be the same axis. Also, in the present embodiment, the common transfer drive source 40 (a motor) serves as the first transfer drive source 41 and the second transfer drive source 42 as described later. Also, an output member 7 that is coupled to an output shaft 47 of the transfer drive source 40 is common to the first transfer drive source 41 and the second transfer drive source 42. The output member 7 is also included in the transfer drive mechanism 4.

Figure 12:
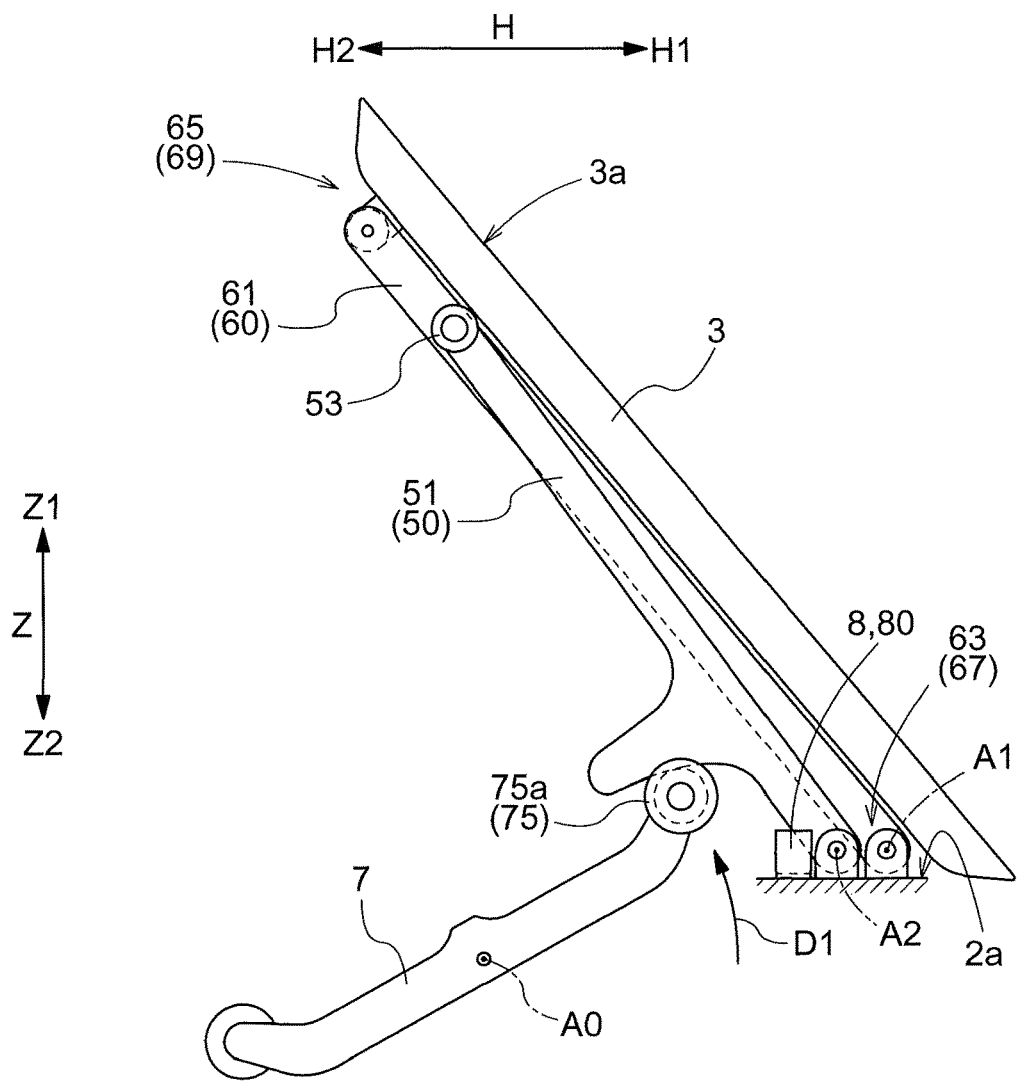
FIG. 12 is a diagram showing a relationship between the placement body in a first tilted state and a swing arm and a support arm.

Each swing arm 50 is formed in such a manner as to extend along the vehicle body width direction H and swings between a reference position (see FIGS. 13 and 15) at which the swing arm 50 extends along the opposing surface 2a and a standing position (see FIGS. 12 and 14) at which the swing arm 50 is tilted relative to the opposing surface 2a. When the swing arm 50 is at the reference position, the placement body 3 is at a horizontal position at which the placement surface 3a extends along the horizontal plane as shown in FIGS. 13 and 15, for example. As shown in FIGS. 12 and 14, for example, while the swing arm 50 moves from the horizontal position to the standing position, the placement body 3 swings due to being pressed by the swing arm 50 from a lower side, and when the swing arm 50 is at the standing position, the placement body 3 is at a tilted position at which the placement surface 3a is tilted relative to the horizontal plane.

Specifically, the first swing arm 51 is formed in such a manner as to extend along a direction (the vehicle body width direction H) orthogonal to the second axis A2 and swings between the reference position (see FIGS. 7, 8, 11, and 13, for example) at which the first swing arm 51 extends along the opposing surface 2a and the standing position (see FIGS. 10 and 12, for example) at which the first swing arm 51 is tilted relative to the opposing surface 2a. When the first swing arm 51 is at the reference position, the placement body 3 is at the horizontal position (see FIGS. 6, 11, and 13, for example) at which the placement surface 3a extends along the horizontal plane. While the first swing arm 51 moves from the horizontal position to the standing position, the placement body 3 swings due to being pressed by the first swing arm 51 from the lower side Z2, and when the first swing arm 51 is at the standing position, the placement body 3 is at the tilted position (a first tilted position, see FIGS. 10 and 12) at which the placement surface 3a is tilted relative to the horizontal plane. At the first tilted position, the placement surface 3a is tilted in such a manner as to face the first side H1 in the vehicle body width direction.

Also, the second swing arm 52 is formed in such a manner as to extend along a direction (the vehicle body width direction H) orthogonal to the fourth axis A4 and swings between the reference position (see FIGS. 7, 8, 11, and 15, for example) at which the second swing arm 52 extends along the opposing surface 2a and the standing position (see FIG. 14, for example) at which the second swing arm 52 is tilted relative to the opposing surface 2a. When the second swing arm 52 is at the reference position, the placement body 3 is at the horizontal position (see FIGS. 6, 11, and 15, for example) at which the placement surface 3a extends along the horizontal plane. While the second swing arm 52 moves from the horizontal position to the standing position, the placement body 3 swings due to being pressed by the second swing arm 52 from the lower side Z2, and when the second swing arm 52 is at the standing position, the placement body 3 is at the tilted position (a second tilted position, see FIG. 14) at which the placement surface 3a is tilted relative to the horizontal plane. At the second tilted position, the placement surface 3a is tilted in such a manner as to face the second side H2 in the vehicle body width direction.

Figure 10:
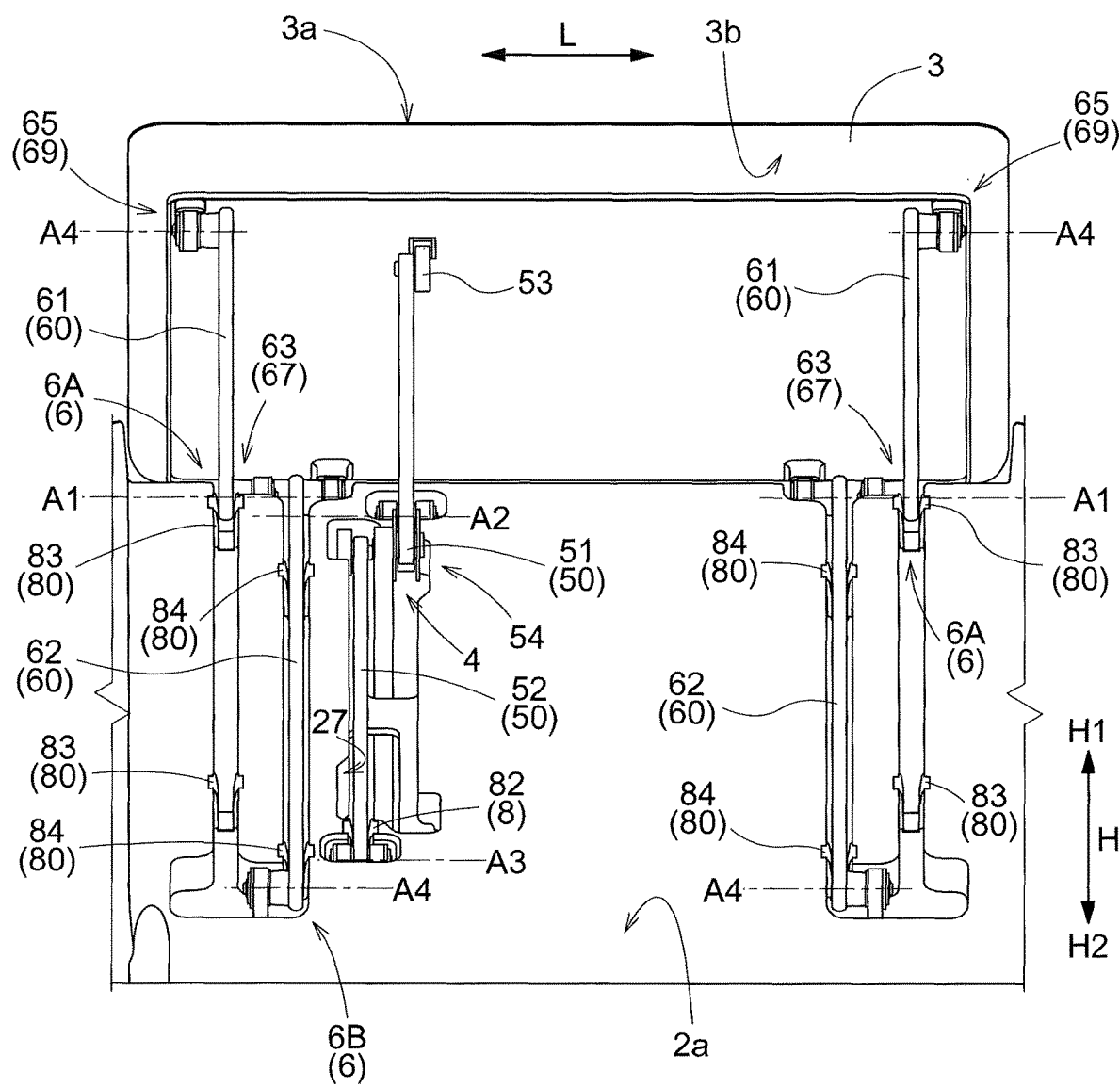
FIG. 10 is a plan view of the article transport vehicle viewed from an opening side in a state where a placement body is tilted.

In the present embodiment, as shown in FIGS. 7 and 10, for example, the swing arms 50 for tilting the placement surface 3a in respective directions are each disposed at a position in the axial direction L. That is, the single first swing arm 51 for tilting the placement surface 3a to the first tilted position is disposed at a position in the axial direction L, and the single second swing arm 52 for tilting the placement surface 3a to the second tilted position is disposed at a position in the axial direction L. Also, the first swing arm 51 and the second swing arm 52 are disposed adjacent to each other in the axial direction L.

If the placement surface 3a is tilted by a single swing arm 50, the placement surface 3a may wobble or warp, for example. Therefore, the present embodiment includes support arms 60, which will be described later, extending in parallel to the swing arms 50 to assist a positional change of the placement body 3 caused by the swing arms 50 and keep the placement body 3 (the placement surface 3a) from warping. The transfer device 30 includes the coupling mechanism 6 that couples the placement body 3 and the carriage body 10, and the support arms 60 constitute a part of the coupling mechanism 6. In the present embodiment, the first coupling mechanism 6A and the second coupling mechanism 6B are provided as the coupling mechanism 6.

As shown in FIGS. 7 and 8, for example, the first coupling mechanism 6A couples the placement body 3 and the carriage body 10 (the vehicle body cover 2) in such a manner that the placement body 3 is swingable relative to the carriage body 10 about the first axis A1 extending along the horizontal plane. The first coupling mechanism 6A includes a first support arm 61 (a support arm 60) that swings about the first axis A1 and a first fulcrum support portion 63 (a fulcrum support portion 67) that supports a swing fulcrum of the first support arm 61. The first support arm 61 is swingably coupled to the placement body 3 at a first coupling portion 65 (a coupling portion 69) that is set in an end portion of the first support arm 61 opposite to the first fulcrum support portion 63.

Specifically, the first support arm 61 is formed in such a manner as to extend along a direction (the vehicle body width direction H) orthogonal to the first axis A1 and swings between a support reference position (a first support reference position: see FIGS. 7, 8, and 13, for example) at which the first support arm 61 extends along the opposing surface 2a and a support standing position (a first support standing position: see FIGS. 10 and 12) at which the first support arm 61 is tilted relative to the opposing surface 2a. When the placement body 3 is caused to swing by the first swing arm 51, the first support arm 61 swings together with the placement body 3 to the support standing position (the first support standing position). At this time, the first support arm 61 swings relative to the vehicle body cover 2 (the carriage body 10) at the first fulcrum support portion 63 coupled to the carriage body 10. At the first coupling portion 65 coupled to the placement body 3, the first support arm 61 changes its position together with the placement body 3 without swinging.

When the placement body 3 is caused to swing by the second swing arm 52, the first support arm 61 does not swing together with the placement body 3 and remains at the support reference position (the first support reference position). That is, the first support arm 61 does not swing relative to the vehicle body cover 2 (the carriage body 10) at the first fulcrum support portion 63 coupled to the carriage body 10. On the other hand, at the first coupling portion 65 coupled to the placement body 3, the first support arm 61 swings relative to the placement body 3 because the placement body 3 swings. That is, the placement body 3 and the first support arm 61 swing relative to each other at the first coupling portion 65, and thus the first support arm 61 remains at the first support reference position.

Also, as shown in FIGS. 7 and 8, for example, the second coupling mechanism 6B couples the placement body 3 and the carriage body 10 in such a manner that the placement body 3 is swingable relative to the carriage body 10 about the third axis A3 extending along the horizontal plane. The second coupling mechanism 6B includes a second support arm 62 (a support arm 60) that swings about the third axis A3 and a second fulcrum support portion 64 (a fulcrum support portion 67) that supports a swing fulcrum of the second support arm 62. The second support arm 62 is swingably coupled to the placement body 3 at a second coupling portion 66 (a coupling portion 69) that is set in an end portion of the second support arm 62 opposite to the second fulcrum support portion 64.

Specifically, the second support arm 62 is formed in such a manner as to extend along a direction (the vehicle body width direction H) orthogonal to the third axis A3 and swings between a support reference position (a second support reference position: see FIGS. 7, 8, and 15, for example) at which the second support arm 62 extends along the opposing surface 2a and a support standing position (a second support standing position: see FIG. 14) at which the second support arm 62 is tilted relative to the opposing surface 2a. When the placement body 3 is caused to swing by the second swing arm 52, the second support arm 62 swings together with the placement body 3 to the support standing position (the second support standing position). At this time, the second support arm 62 swings relative to the vehicle body cover 2 (the carriage body 10) at the second fulcrum support portion 64 coupled to the carriage body 10. At the second coupling portion 66 coupled to the placement body 3, the second support arm 62 changes its position together with the placement body 3 without swinging.

When the placement body 3 is caused to swing by the first swing arm 51, the second support arm 62 does not swing together with the placement body 3 and remains at the support reference position (the second support reference position). That is, the second support arm 62 does not swing relative to the vehicle body cover 2 (the carriage body 10) at the second fulcrum support portion 64 coupled to the carriage body 10. On the other hand, at the second coupling portion 66 coupled to the placement body 3, the second support arm 62 swings relative to the placement body 3 because the placement body 3 swings. That is, the placement body 3 and the second support arm 62 swing relative to each other at the second coupling portion 66, and thus the second support arm 62 remains at the second support reference position.

As shown in FIG. 11, the transfer drive mechanism 4 includes the transfer drive source 40 and a transmission mechanism 5 for transmitting driving force from the transfer drive source 40 to the placement body 3. The transmission mechanism 5 includes the swing arms 50 and the output member 7 that is coupled to the transfer drive source 40. The output member 7 transmits driving force from the transfer drive source 40 to the swing arms 50, and the driving force is transmitted to the placement body 3 via the swing arms 50. The swing arms 50 constituting the transmission mechanism 5 can be said to be driven members that are driven by the output member 7.

As shown in FIG. 11, in the present embodiment, the transmission mechanism 5 includes the output member 7 that is coupled to the output shaft 47 of the transfer drive source 40 and is shaped as a lever that swings about a rotation axis (an output axis A0) of the output shaft 47. The swing arms 50 are driven by the output member 7. Pressing rollers 75 that come into contact with the swing arms 50 and cause the swing arms 50 to swing are provided in two end portions of the output member 7 in the vehicle body width direction H. Each swing arm 50 includes a cam portion 57 protruding toward the lower side Z2, and the pressing rollers 75 respectively come into contact with the cam portions 57. The swing arms 50 are not coupled to the output member 7 and are configured to operate by being pressed by the output member 7. As a result of the pressing rollers 75 pressing the swing arms 50 along the cam portions 57, the swing arms 50 swing about the output axis A0.

For example, when the output member 7 is caused to swing in a first swing direction D1 shown in FIG. 11 by the transfer drive source 40, the pressing roller 75 (a first pressing roller 75a) disposed on the second side H2 in the vehicle body width direction comes into contact with the cam portion 57 of the first swing arm 51 and presses the cam portion 57 to change the position of the first swing arm 51 from the reference position (see FIGS. 11 and 13) to the standing position (FIG. 12). Likewise, when the output member 7 is caused to swing in a second swing direction D2 shown in FIG. 11 by the transfer drive source 40, the pressing roller 75 (a second pressing roller 75b) disposed on the first side H1 in the vehicle body width direction comes into contact with the cam portion 57 of the second swing arm 52 and presses the cam portion 57 to change the position of the second swing arm 52 from the reference position (see FIGS. 11 and 15) to the standing position (FIG. 14). The placement body 3 changes its position between the horizontal position and the tilted positions in conjunction with the swing arms 50, which serve as driven members.

As described above, the present embodiment includes the support arms 60 provided in parallel to the swing arms 50 to assist a positional change of the placement body 3 caused by the swing arms 50 and keep the placement body 3 (the placement surface 3a) from warping. In the present embodiment, two support arms 60 are disposed so as to sandwich the first swing arm 51 in the axial direction L to support the placement body 3 when the position of the placement surface 3a is changed to the first tilted position by the first swing arm 51. That is, the first swing arm 51 is disposed between two first support arms 61 in the axial direction L. Likewise, two support arms 60 are disposed so as to sandwich the second swing arm 52 in the axial direction L to support the placement body 3 when the position of the placement surface 3a is changed to the second tilted position by the second swing arm 52. That is, the second swing arm 52 is disposed between two second support arms 62 in the axial direction L. As described above, two support arms 60 are provided for each swing arm 50, and therefore, it is possible to keep the placement body 3 (the placement surface 3a) from warping when the position of the placement body 3 is changed by the swing arm 50.

Figure 9:
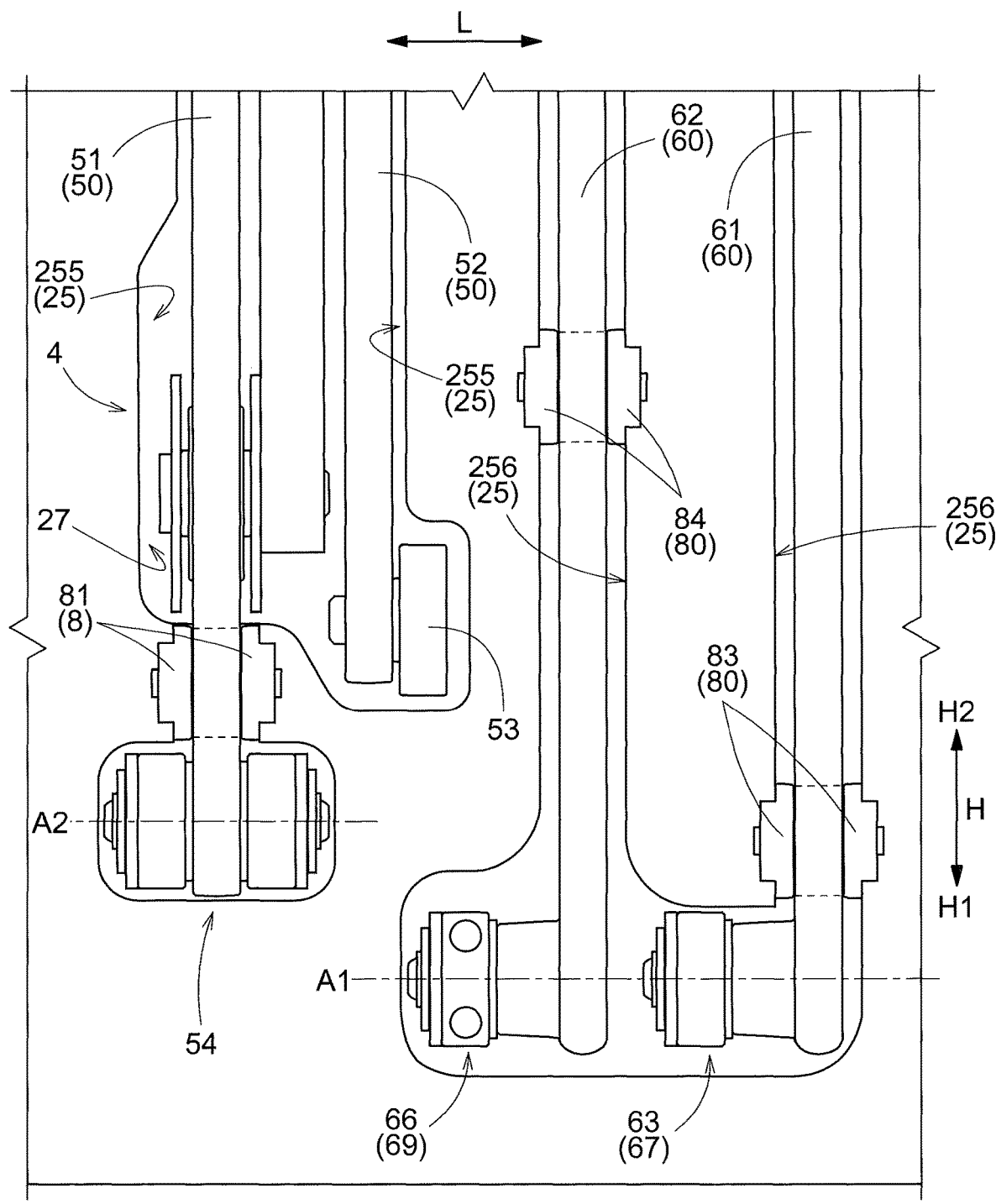
FIG. 9 is an enlarged plan view of the swing arms and the support arms that are housed.

As shown in FIGS. 8 and 9, recessed grooves 25 for housing the swing arms 50 and the support arms 60 are formed in the opposing surface 2a of the vehicle body cover 2. When a recessed groove 25 for housing the swing arms 50 and a recessed groove 25 for housing the support arms 60 are distinguished from each other, the recessed groove 25 for housing the swing arms 50 will be referred to as a swing arm housing groove 25s, and the recessed groove 25 for housing the support arms 60 will be referred to as a support arm housing groove 25b.

Each swing arm 50 is swingably supported by the vehicle body cover 2 (the carriage body 10) at a swing support portion 54 on one end side in the vehicle body width direction H. The other end of the swing arm 50 is a free end that is provided with a contact roller 53. The contact roller 53 moves in the vehicle body width direction H while being in contact with the lower surface 3b of the placement body 3, and thus changes the position of the placement surface 3a of the placement body 3 from the horizontal position to the tilted position. Also, the swing arm 50 changes its position by being pressed by the output member 7 as described above. Accordingly, the swing arm housing groove 25s is open to allow the output member 7 to move past the opposing surface 2a toward the upper side Z1. That is, the swing arm housing groove 25s is formed as an opening 27, and it can be said that the vehicle body cover 2 includes the opening 27 through which the output member 7 passes in the up-down direction Z.

One end of each support arm 60 in the vehicle body width direction H is swingably supported by the vehicle body cover 2, and the other end of the support arm 60 in the vehicle body width direction H is swingably supported by the lower surface 3b of the placement body 3. In other words, the placement body 3 is attached to the vehicle body cover 2 via the support arm 60 in such a manner as to be swingable relative to the vehicle body cover 2. Unlike the swing arm housing groove 25s, the support arm housing groove 25b is shaped as a groove and does not extend through the vehicle body cover 2 in the up-down direction Z.

As described above, the placement body 3, the swing arms 50 (the driven members), and the support arms 60 are supported by the vehicle body cover 2. The wheel drive source 90, the transfer drive source 40, and the output member 7 are supported by the vehicle body frame 1. As shown in FIGS. 7 and 11, for example, the vehicle body cover 2 covers the wheel drive source 90 and the transfer drive source 40. As described above, the swing arms 50 driven by the output member 7 are not coupled to the output member 7 and are configured to operate by being pressed by the output member 7. Accordingly, the vehicle body cover 2 is attached to the vehicle body frame 1 in such a manner as to be attachable to and detachable from the vehicle body frame 1 while supporting the placement body 3, the swing arms 50, and the support arms 60.

Figure 16:
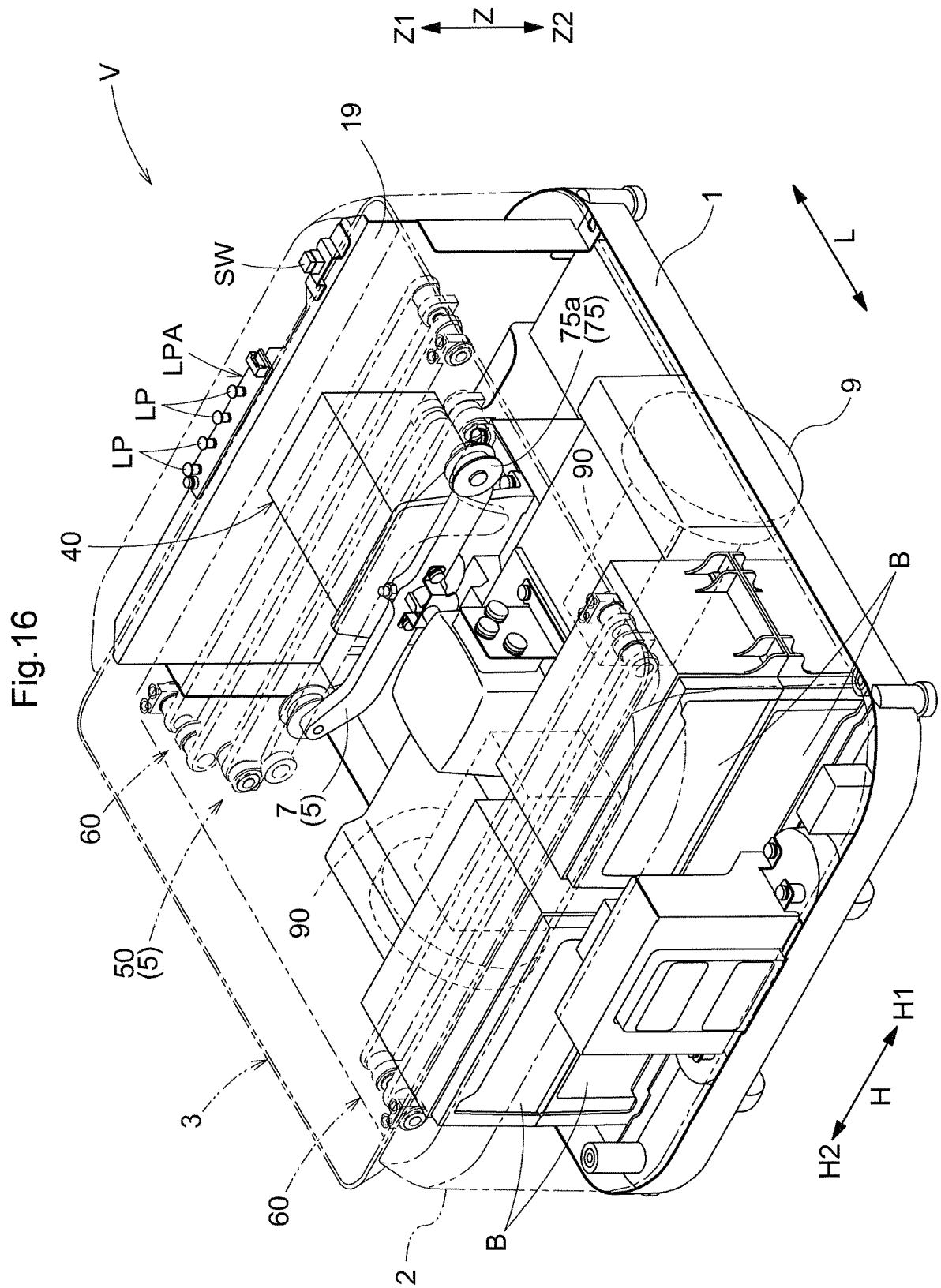
FIG. 16 is a diagram showing an example of a state where a vehicle body cover is removed from a vehicle body frame.

FIG. 16 shows an example of a state where the vehicle body cover 2 is removed from the vehicle body frame 1. In addition to the vehicle body frame 1, the swing arms 50 and the support arms 60 are also shown using imaginary lines to clarify the relationship between the swing arms 50 and the output member 7 and the relationship between the swing arms 50 and the support arms 60. The swing arms 50 are removed from the vehicle body frame 1 together with the vehicle body cover 2, and therefore, the output member 7 is exposed and maintenance of the output member 7 can be easily performed. For example, the pressing rollers 75 can be easily replaced when worn out. Also, in the present embodiment, the transfer drive source 40 is disposed on the lower side Z2 of the support arms 60, but the support arms 60 are removed from the vehicle body frame 1 together with the vehicle body cover 2, and therefore, the transfer drive source 40 is exposed and maintenance of the transfer drive source 40 can be easily performed.

Also, in the present embodiment, the power storage body B is disposed on the lower side Z2 of the support arms 60 as shown in FIG. 16. It is known that the power storage capability of the power storage body B such as a storage battery or a capacitor degrades over time. When the power storage capability has degraded to be lower than or equal to a prescribed level, the power storage body B is replaced. In the present embodiment, the support arms 60 are removed from the vehicle body frame 1 together with the vehicle body cover 2, and therefore, the power storage body B is exposed and can be easily replaced.

As shown in FIGS. 6 and 7, the vehicle body cover 2 includes a top surface portion 21 that faces the lower surface 3b of the placement body 3 and covers the wheel drive source 90 and the transfer drive source 40 from the upper side, and a side wall portion 23 that extends from an outer edge portion of the top surface portion 21 toward the lower side. A lower end 23t of the side wall portion 23 is on the lower side Z2 of an upper end 9t of the wheel 9. That is, the side wall portion 23 covers a side surface of the wheel 9. In the state where the vehicle body cover 2 is attached to the vehicle body frame 1, most of the members constituting the article transport vehicle V including a portion of the wheel 9 are covered by the vehicle body cover 2. Therefore, it is possible to appropriately protect the article transport vehicle V from foreign matter including dust, which would otherwise enter the inside of the article transport vehicle V. On the other hand, when it is necessary to perform maintenance of the wheel 9, the wheel drive source 90, the transfer drive source 40, the output member 7, or the like, the vehicle body cover 2 can be easily removed and therefore, the maintenance is facilitated.

Also, the article transport vehicle V is configured to be capable of being stopped when there is an abnormality in the article transport facility F or the individual article transport vehicle V, for example. In the present embodiment, the article transport vehicle V includes a stop switch SW for stopping the wheel drive source 90 and the transfer drive source 40 as shown in FIGS. 7 and 8, for example. The stop switch SW is supported by the vehicle body frame 1, and the vehicle body cover 2 includes a stop switch opening 29 formed at a position corresponding to the stop switch SW.

Such a stop switch SW is often electrically connected to the wheel drive source 90 and the transfer drive source 40 or a control device (not shown) for controlling the wheel drive source 90 and the transfer drive source 40 via connecting wires. Accordingly, if the stop switch SW is supported by the vehicle body cover 2, the vehicle body cover 2 cannot be removed from the vehicle body frame 1 unless the connecting wires are removed. If the stop switch SW is supported by the vehicle body frame 1 as in the present embodiment, there is no need to remove the connecting wires when removing the vehicle body cover 2 from the vehicle body frame 1. Also, the vehicle body cover 2 includes the stop switch opening 29, and therefore, the stop switch SW can be easily operated from the outside even if the stop switch SW is supported by the vehicle body frame 1.

Also, the article transport vehicle V includes a display lamp LP that serves as an indicator that indicates a state of a section of the article transport vehicle V, such as a driving state of the wheel drive source 90, a driving state of the transfer drive source 40, the position of the placement body 3, and a charge amount of the power storage body B (a storage battery, a capacitor, etc.). The present embodiment includes a plurality of display lamps LP, and a display lamp substrate LPA on which the display lamps LP are mounted is supported by the vehicle body frame 1. The vehicle body cover 2 attached to the vehicle body frame 1 covers the display lamps LP, but the vehicle body cover 2 includes light transmitting sections 28 that are provided at positions corresponding to the display lamps LP and transmit light from the display lamps LP outward from the vehicle body cover 2. Due to the light transmitting sections 28 being provided, it is possible to support the display lamps LP on the vehicle body frame 1 and attach the vehicle body cover 2 to the vehicle body frame 1 in such a manner as to cover the display lamps LP.

A control circuit and a power source (both not shown) for the display lamps LP are often supported by the vehicle body frame 1, and the display lamps LP are often connected to the power source via connecting wires. Accordingly, if the display lamps LP are supported by the vehicle body cover 2, the vehicle body cover 2 cannot be removed from the vehicle body frame 1 unless the connecting wires are removed. If the display lamps LP are supported by the vehicle body frame 1 as in the present embodiment, there is no need to remove the connecting wires when removing the vehicle body cover 2 from the vehicle body frame 1. Also, the vehicle body cover 2 includes the light transmitting sections 28, and therefore, lighting states of the display lamps LP can be easily checked from the outside even if the display lamps LP are supported by the vehicle body frame 1.

Incidentally, the swing arms 50 may wobble when changing their positions from the reference position to the standing position to lift the placement body 3. If the swing arms 50 wobble and consequently the placement body 3 wobbles, an article W supported by the placement body 3 may fall before sliding down to a transfer destination or durability of the swing arms 50 may be reduced. Therefore, in the present embodiment, the opposing surface 2a is provided with guide members 8 for guiding swinging movement of the swing arms 50 as shown in FIGS. 8, 9, and 10, for example.

The guide members 8 are detachably attached to the carriage body 10, and can be replaced easily when worn out due to sliding movement of the swing arms 50 against the guide members 8 or friction between the guide members 8 and the swing arms 50, for example. In the present embodiment, the guide members 8 are fitted into the swing arm housing groove 255 described above. In the present embodiment, each guide member 8 is shaped as a groove that is open on the upper side Z1. As described above, the swing arm housing groove 255 is also shaped as a groove, and the guide members 8 are fixed by being fitted into the swing arm housing groove 255.

As described above, in the present embodiment, the first swing arm 51 and the second swing arm 52 are provided as the swing arms 50. The first swing arm 51 is provided with a first guide member 81 that guides swinging movement of the first swing arm 51, and the second swing arm 52 is provided with a second guide member 82 that guides swinging movement of the second swing arm 52.

In the present embodiment, the support arms 60 are also provided to stably tilt the placement body 3 as described above. The support arms 60 also swing similarly to the swing arms 50, and accordingly, as is the case with the swing arms 50, support guide members 80 for guiding swinging movement of the support arms 60 are provided in the opposing surface 2a.

Similarly to the guide members 8, the support guide members 80 are detachably attached to the carriage body 10. The support guide members 80 can be replaced easily when worn out due to friction between the support guide members 80 and the support arms 60, for example. In the present embodiment, the support guide members 80 are fitted into the support arm housing groove 256 described above. In the present embodiment, each support guide member 80 is shaped as a groove that is open on the upper side Z1 similarly to the guide members 8. As described above, the support arm housing groove 256 is also shaped as a groove, and the support guide members 80 are fixed by being fitted into the support arm housing groove 256.

In the present embodiment, the first support arm 61 and the second support arm 62 are provided as the support arms 60. The first support arm 61 is provided with a first support guide member 83 that guides swinging movement of the first support arm 61, and the second support arm 62 is provided with a second support guide member 84 that guides swinging movement of the second support arm 62.

As described above, according to the present embodiment, it is possible to provide an article transport vehicle V that makes it possible to easily perform maintenance of drive sources of the wheel 9 and the transfer device 30 (the wheel drive source 90 and the transfer drive source 40), the transfer drive mechanism 4, and the like.

The following describes other embodiments. Configurations of the following embodiments are not only applicable individually but also applicable in combination with configurations of other embodiments as long as no contradiction arises.

(1) In the above embodiment, an example is described in which the coupling mechanism 6 includes the first coupling mechanism 6A and the second coupling mechanism 6B, the transfer drive mechanism 4 includes the first transfer drive mechanism 4A and the second transfer drive mechanism 4B, and articles W can be transferred to both sides in the vehicle body width direction H (the width direction Y). However, a configuration is also possible in which the coupling mechanism 6 includes only either the first coupling mechanism 6A or the second coupling mechanism 6B (e.g., only the first coupling mechanism 6A), and the transfer drive mechanism 4 includes only either the first transfer drive mechanism 4A or the second transfer drive mechanism 4B (e.g., only the first transfer drive mechanism 4A). In this case as well, if the article transport vehicle V travels in both directions along the traveling direction X (i.e., travels by turning 180 degrees) with the front side of the article transport vehicle V fixed, it is possible to transfer articles W to both sides in the width direction Y relative to the article transport vehicle V even if the article transport vehicle V is configured to be capable of transferring articles W to only one side in the vehicle body width direction H.

(2) In the above embodiment, an example is described in which the support arms 60 are provided. However, a configuration is also possible in which the support arms 60 are not provided and only the swing arms 50 are provided.

(3) In the above embodiment, an example is described in which the vehicle body cover 2 includes the opening 27 through which the output member 7, which is a lever member, passes in the up-down direction Z. However, the opening 27 may also be formed in such a manner that the swing arms 50, which are driven members, pass through the opening 27 in the up-down direction Z. In any case, rather than the configuration in which the opposing surface 2a includes such an opening 27, a configuration may be adopted in which the entire opposing surface 2a is open excluding the swing support portions 54 supporting the swing arms 50 and the like.

(4) In the above embodiment, an example is described in which the article transport vehicle V includes the stop switch SW and the display lamps LP. However, a configuration is also possible in which the article transport vehicle V does not include the stop switch SW and the display lamps LP.

The following briefly describes a summary of the article transport vehicle described above.

In an aspect, an article transport vehicle is configured to transport an article and includes: a vehicle body frame; a vehicle body cover; a wheel supported in such a manner as to be rotatable relative to the vehicle body frame; a wheel drive source configured to drive the wheel; a placement body including a placement surface on which the article is placeable; and a transfer drive mechanism configured to drive the placement body to transfer the article, wherein the transfer drive mechanism includes: a transfer drive source; and a transmission mechanism configured to transmit driving force from the transfer drive source to the placement body, the transmission mechanism includes: an output member coupled to an output shaft of the transfer drive source; and a driven member configured to be driven by the output member, the placement body moves in conjunction with the driven member, the driven member is not coupled to the output member and is configured to operate by being pressed by the output member, the wheel drive source, the transfer drive source, and the output member are supported by the vehicle body frame, the placement body and the driven member are supported by the vehicle body cover, and the vehicle body cover covers the wheel drive source and the transfer drive source and is detachably attached to the vehicle body frame.

According to this configuration, the placement body and the driven member are supported by the vehicle body cover, and the wheel drive source, the transfer drive source, and the output member are supported by the vehicle body frame. Also, the driven member that operates by being pressed by the output member is not coupled to the output member. That is, the vehicle body cover is attached to the vehicle body frame in such a manner as to be attachable to and detachable from the vehicle body frame while supporting the placement body and the driven member. The vehicle body cover covers the wheel drive source and the transfer drive source, and accordingly, when the vehicle body cover is removed from the vehicle body frame, maintenance of the wheel drive source and the transfer drive source can be easily performed. Also, the output member is coupled to the output shaft of the transfer drive source, and accordingly, maintenance of the output member can be easily performed as well. As described above, according to this configuration, it is possible to provide an article transport vehicle that makes it possible to easily perform maintenance of the drive sources of the wheel and the placement body, the transfer drive mechanism, and the like.

Here, it is preferable that the output member is a lever member configured to swing about a rotation axis of the output shaft, and the vehicle body cover includes an opening through which the output member passes in an up-down direction.

According to this configuration, even if the transfer drive source and the output member are housed in the state of being covered by the vehicle body cover, the output member passes through the opening in the up-down direction when swinging, and therefore, the output member can appropriately drive the driven member. Moreover, when the opening is provided, it is possible to appropriately remove the vehicle body cover from the vehicle body frame together with the driven member while leaving the output member on the vehicle body frame. Also, the opening makes it easy to position the driven member relative to the vehicle body frame supporting the output member when the vehicle body cover is attached to the vehicle body frame.

It is preferable that the vehicle body cover includes: a top surface portion facing a lower surface of the placement body and covering the wheel drive source and the transfer drive source from an upper side; and a side wall portion extending from an outer edge portion of the top surface portion toward a lower side, and a lower end of the side wall portion is on the lower side of an upper end of the wheel.

According to this configuration, the side wall portion covers a side surface of the wheel, and most of the members constituting the article transport vehicle including a portion of the wheel are covered by the vehicle body cover when the vehicle body cover is attached to the vehicle body frame. Therefore, it is possible to appropriately protect the article transport vehicle from foreign matter including dust, which would otherwise enter the inside of the article transport vehicle. On the other hand, when it is necessary to perform maintenance of the wheel, the wheel drive source, the transfer drive source, the output member, or the like, the vehicle body cover can be removed and these members can be exposed, and therefore, the maintenance is facilitated.

It is preferable that the article transport vehicle further includes a stop switch configured to stop the wheel drive source and the transfer drive source, wherein the stop switch is supported by the vehicle body frame, and the vehicle body cover includes a stop switch opening at a position corresponding to the stop switch.

Such a stop switch is often electrically connected to the wheel drive source and the transfer drive source or a control device for controlling the wheel drive source and the transfer drive source via connecting wires. Accordingly, if the stop switch is supported by the vehicle body cover, the vehicle body cover cannot be removed from the vehicle body frame unless the connecting wires are removed. If the stop switch is supported by the vehicle body frame as in this configuration, there is no need to remove the connecting wires when removing the vehicle body cover from the vehicle body frame. Also, the vehicle body cover includes the stop switch opening, and therefore, the stop switch can be easily operated from the outside even if the stop switch is supported by the vehicle body frame.

It is preferable that the article transport vehicle further includes a display lamp configured to indicate a state of a section, wherein the display lamp is supported by the vehicle body frame, and the vehicle body cover includes a light transmitting section that is provided at a position corresponding to the display lamp and configured to transmit light from the display lamp outward from the vehicle body cover.

A control circuit and a power source for the display lamp are often supported by the vehicle body frame, and the display lamp is often connected to the power source via a connecting wire. Accordingly, if the display lamp is supported by the vehicle body cover, the vehicle body cover cannot be removed from the vehicle body frame unless the connecting wire is removed. If the display lamp is supported by the vehicle body frame as in the present embodiment, there is no need to remove the connecting wire when removing the vehicle body cover from the vehicle body frame. Also, the vehicle body cover includes the light transmitting section, and therefore, a lighting state of the display lamp can be easily checked from the outside even if the display lamp is supported by the vehicle body frame.

It is preferable that the placement body is swingably supported by the vehicle body cover in such a manner as to be swingable about a first axis extending along a horizontal plane, the output member is a lever member configured to swing about a rotation axis of the output shaft that is parallel to the first axis, the driven member is a swing arm configured to swing about a second axis that is parallel to the first axis, the swing arm swings between a reference position at which the swing arm extends along the horizontal plane and a standing position at which the swing arm is tilted relative to the horizontal plane, and when the swing arm is at the reference position, the placement body is at a horizontal position at which the placement surface extends along the horizontal plane, while the swing arm moves from the horizontal position to the standing position, the placement body swings about the first axis due to being pressed by the swing arm from a lower side, and when the swing arm is at the standing position, the placement body is at a tilted position at which the placement surface is tilted relative to the horizontal plane.

According to this configuration, the article transport vehicle can transfer an article from the article transport vehicle to a transfer target location by changing the position of the placement surface, on which the article is placed at the horizontal position, to the tilted position to cause the article to slide. The placement body including the placement surface and the driven member (the swing arm) that tilts the placement body to change the position of the placement surface to the tilted position are supported by the vehicle body cover, and the output member that drives the driven member (the swing arm) and the transfer drive source are supported by the vehicle body frame. In the article transport vehicle having a relatively complex mechanism as described above, the placement body and the driven member (the swing arm) can be removed from the vehicle body frame together with the vehicle body cover, and thus it is possible to obtain a structure that facilitates maintenance of the output member and the transfer drive source.

What is claimed is:

1. An article transport vehicle configured to transport an article, comprising:
    a vehicle body frame;
    a vehicle body cover;
    a wheel supported to be rotatable relative to the vehicle body frame;
    a wheel drive source configured to drive the wheel;
    a placement body including a placement surface on which the article is placeable; and
    a transfer drive mechanism configured to drive the placement body to transfer the article,
    wherein the transfer drive mechanism comprises:
        a transfer drive source; and
        a transmission mechanism configured to transmit driving force from the transfer drive source to the placement body,
    wherein the transmission mechanism comprises:
        an output member coupled to an output shaft of the transfer drive source; and
        a driven member configured to be driven by the output member,
    the placement body moves in conjunction with the driven member, and
    wherein:
        the driven member is uncoupled from the output member and is configured to operate by being pressed by the output member,
        the wheel drive source, the transfer drive source, and the output member are supported by the vehicle body frame,
        the placement body and the driven member are supported by the vehicle body cover, and
        the vehicle body cover covers the wheel drive source and the transfer drive source and is detachably attached to the vehicle body frame.

2. The article transport vehicle according to claim 1,
    wherein the output member is a lever member configured to swing about a rotation axis of the output shaft, and
    wherein the vehicle body cover includes an opening through which the output member passes in an up-down direction.

3. The article transport vehicle according to claim 1,
    wherein the vehicle body cover comprises:
        a top surface portion facing a lower surface of the placement body and covering the wheel drive source and the transfer drive source from an upper side; and
        a side wall portion extending from an outer edge portion of the top surface portion toward a lower side, and
    wherein a lower end of the side wall portion is on the lower side of an upper end of the wheel.

4. The article transport vehicle according to claim 1, further comprising
    a stop switch configured to stop the wheel drive source and the transfer drive source,
    wherein the stop switch is supported by the vehicle body frame, and
    wherein the vehicle body cover includes a stop switch opening at a position corresponding to the stop switch.

5. The article transport vehicle according to claim 1, further comprising
    a display lamp configured to indicate a state of a section,
    wherein the display lamp is supported by the vehicle body frame, and
    wherein the vehicle body cover comprises a light transmitting section that is provided at a position corresponding to the display lamp and configured to transmit light from the display lamp outward from the vehicle body cover.

6. The article transport vehicle according to claim 1, wherein:
    the placement body is swingably supported by the vehicle body cover to be swingable about a first axis extending along a horizontal plane,
    the output member is a lever member configured to swing about a rotation axis of the output shaft that is parallel to the first axis,
    the driven member is a swing arm configured to swing about a second axis that is parallel to the first axis,
    the swing arm swings between a reference position at which the swing arm extends along the horizontal plane and a standing position at which the swing arm is tilted relative to the horizontal plane, and
    when the swing arm is at the reference position, the placement body is at a horizontal position at which the placement surface extends along the horizontal plane, while the swing arm moves from the horizontal position to the standing position, the placement body swings about the first axis due to being pressed by the swing arm from a lower side, and when the swing arm is at the standing position, the placement body is at a tilted position at which the placement surface is tilted relative to the horizontal plane.

7. An article transport vehicle configured to transport an article, comprising:
    a vehicle body frame;
    a vehicle body cover;
    a wheel supported to be rotatable relative to the vehicle body frame;

a wheel drive source configured to drive the wheel;
a placement body including a placement surface on which the article is placeable; and
a transfer drive mechanism configured to drive the placement body to transfer the article,
wherein the transfer drive mechanism comprises:
    a transfer drive source; and
    a transmission mechanism configured to transmit driving force from the transfer drive source to the placement body,
wherein the transmission mechanism comprises:
    an output member coupled to an output shaft of the transfer drive source; and
    a driven member configured to be driven by the output member,
the placement body moves in conjunction with the driven member, and
wherein:
    the driven member is uncoupled from the output member and is configured to operate by being pressed by the output member,
    the wheel drive source, the transfer drive source, and the output member are supported by the vehicle body frame,
    the placement body and the driven member are supported by the vehicle body cover, and
    the vehicle body cover covers the wheel drive source and the transfer drive source and is detachably attached to the vehicle body frame while supporting the placement body and the driven member.

8. An article transport vehicle configured to transport an article, comprising:
a vehicle body frame;
a vehicle body cover;
a wheel supported to be rotatable relative to the vehicle body frame;
a wheel drive source configured to drive the wheel;
a placement body including a placement surface on which the article is placeable; and
a transfer drive mechanism configured to drive the placement body to transfer the article,
wherein the transfer drive mechanism comprises:
    a transfer drive source; and
    a transmission mechanism configured to transmit driving force from the transfer drive source to the placement body,
wherein the transmission mechanism comprises:
    an output member coupled to an output shaft of the transfer drive source; and
    a driven member configured to be driven by the output member,
wherein the article transport vehicle further comprises support member assisting a positional change of the placement body caused by the driven member and keeping the placement body from warping,
the placement body moves in conjunction with the driven member, and
wherein:
    the driven member is uncoupled from the output member and is configured to operate by being pressed by the output member,
    the wheel drive source, the transfer drive source, and the output member are supported by the vehicle body frame,
    the placement body and the driven member are supported by the vehicle body cover, and
    the vehicle body cover covers the wheel drive source and the transfer drive source and is detachably attached to the vehicle body frame while supporting the placement body and the driven member.

\* \* \* \* \*